United States Patent
Bookbinder et al.

(10) Patent No.: US 9,964,701 B2
(45) Date of Patent: May 8, 2018

(54) METHODS OF MANUFACTURING WIDE-BAND MULTI-MODE OPTICAL FIBERS AND CORE PREFORMS FOR THE SAME USING SPECIFIC FLUORINE DOPING PARAMETER AND 850 NM ALPHA PROFILE

(71) Applicant: Corning Incorporated, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/601,527

(22) Filed: May 22, 2017

(65) Prior Publication Data
US 2017/0363806 A1 Dec. 21, 2017

Related U.S. Application Data

(60) Provisional application No. 62/350,398, filed on Jun. 15, 2016.

(51) Int. Cl.
*G02B 6/028* (2006.01)
*C03B 37/012* (2006.01)
(Continued)

(52) U.S. Cl.
CPC .......... *G02B 6/0288* (2013.01); *C03B 37/012* (2013.01); *C03B 37/01453* (2013.01);
(Continued)

(58) Field of Classification Search
CPC .............. G02B 6/0288; G02B 6/02047; G02B 6/02395; G02B 6/036; G02B 6/28;
(Continued)

(56) References Cited

U.S. PATENT DOCUMENTS 4,222,631 A 9/1980 Olshansky
7,315,677 B1 1/2008 Li
(Continued)

FOREIGN PATENT DOCUMENTS

EP 1503230 10/2012

OTHER PUBLICATIONS

R. Olshansky, "Mode coupling effects in graded-index optical fibers", Applied Optics vol. 14, pp. 935-945, 1975.
(Continued)

*Primary Examiner* — Andrew Jordan
(74) *Attorney, Agent, or Firm* — Robert L. Carlson

(57) ABSTRACT

A method of making a multi-mode optical fiber that includes: depositing a porous germania-doped silica soot to form a germania-doped porous soot preform; depositing a porous silica layer over the porous soot preform; doping the porous soot preform and the porous silica layer with a fluorine dopant to form a co-doped soot preform having a core region and a fluorine-doped trench region; consolidating the co-doped soot preform to form a sintered glass, co-doped core preform having a refractive index alpha profile between 1.9 and 2.2 measured at 850 nm; depositing a cladding comprising silica over the sintered glass, co-doped preform to form a multi-mode optical fiber preform; drawing the optical fiber preform into a multi-mode optical fiber. Further, the step of doping the germania-doped soot preform and the porous silica layer is conducted according to a doping parameter ($\Phi$) that is set between 20 and 300, and given by:

$$\Phi = \frac{1 \times 10^{14} R_{prc}^2 \exp(-E/RT_{dop}) T_{dop}^{1/2}}{x^{3/4}}.$$

20 Claims, 14 Drawing Sheets

(51) Int. Cl.
    *C03B 37/15*         (2006.01)
    *G02B 6/02*          (2006.01)
    *G02B 6/036*        (2006.01)
    *G02B 6/28*          (2006.01)
    *C03B 37/014*       (2006.01)

(52) U.S. Cl.
    CPC .......... *C03B 37/15* (2013.01); *G02B 6/02047* (2013.01); *G02B 6/02395* (2013.01); *G02B 6/036* (2013.01); *G02B 6/28* (2013.01); *C03B 2201/12* (2013.01); *C03B 2201/31* (2013.01); *C03B 2203/23* (2013.01); *C03B 2203/26* (2013.01)

(58) Field of Classification Search
    CPC ........ G02B 6/02; G02B 6/028; C03B 37/012; C03B 37/01453; C03B 37/15; C03B 37/014; C03B 2201/12; C03B 2201/31; C03B 2203/23; C03B 2203/26
    See application file for complete search history.

(56) References Cited

U.S. PATENT DOCUMENTS

| | | | |
|---|---|---|---|
| 7,412,142 B2* | 8/2008 | Chen | ................. C03B 37/01217 385/123 |
| 8,588,568 B2 | 11/2013 | Bookbinder | |
| 8,965,163 B2 | 2/2015 | Bookbinder | |
| 2002/0073740 A1 | 6/2002 | Dawes et al. | |
| 2007/0269175 A1* | 11/2007 | Chen | ................. C03B 37/01217 385/125 |
| 2014/0352361 A1 | 12/2014 | Dawes et al. | |
| 2017/0363806 A1* | 12/2017 | Bookbinder | .......... C03B 37/012 |

OTHER PUBLICATIONS

R. Olshansky, "Multiple-α index profile", Applied Optics vol. 18, pp. 683-689, 1979.
International Search Report and Written Opinion PCT/US2017/037686 dated Nov. 29, 2017.

* cited by examiner

METHODS OF MANUFACTURING WIDE-BAND MULTI-MODE OPTICAL FIBERS AND CORE PREFORMS FOR THE SAME USING SPECIFIC FLUORINE DOPING PARAMETER AND 850 NM ALPHA PROFILE

This application claims the benefit of priority under 35 U.S.C. § 119 of U.S. Provisional Application Ser. No. 62/350,398 filed on Jun. 15, 2016 the content of which is relied upon and incorporated herein by reference in its entirety.

BACKGROUND

The disclosure generally relates to methods of making and manufacturing for wide-band multi-mode optical fibers and core preforms and, more particularly, to processes for making co-doped core preforms for such fibers of various sizes under various processing conditions.

Optical fibers, including multi-mode optical fibers, are being envisioned for use in data centers and fiber home networks, among other applications, with enlarged operating windows to facilitate data transmission over increasingly larger wavelength ranges. For example, multi-mode optical fiber (MMF) designs with graded index cores are being designed and envisioned to operating over a range of wavelengths at or near peak bandwidth. Some of these new optical fiber designs are being contemplated with complex refractive index profiles, often with two or more dopants having different concentration profiles.

SUMMARY

One aspect of the present disclosure relates to a method of making a co-doped core preform for a multi-mode optical fiber that includes the steps: depositing a porous soot comprising germania-doped silica to form a germania-doped porous soot preform; doping the germania-doped porous soot preform in a furnace with a fluorine dopant to form a co-doped soot preform; and consolidating the co-doped soot preform to form a sintered glass, co-doped core preform having a refractive index alpha profile between 1.9 and 2.2 measured at 850 nm. Further, the step of doping the germania-doped soot preform with a fluorine dopant is conducted such that a doping parameter, $\Phi$, is between 20 and 300, and given by:

$$\Phi = \frac{1 \times 10^{14} R_{pre}^2 \exp(-E/RT_{dop}) T_{dop}^{1/2}}{x^{3/4}},$$

where $T_{dop}$ is the doping temperature, x is the partial pressure of the fluorine dopant in the furnace during the doping step, E is the activation energy of the doping step, R is the universal gas constant, and $R_{pre}$ is the thickness of the germania-doped porous soot preform.

Certain aspects of the method of making a co-doped core preform for a multi-mode optical fiber can be conducted with a doping parameter, $\Phi$, set between 20 and 300, in some embodiments between 40 and 250, and in other embodiments between 45 and 225.

Another aspect of the present disclosure relates to a method of making a co-doped core preform and trench for a multi-mode optical fiber that includes the steps: depositing a germania-doped porous soot comprising silica to form a germania-doped porous soot preform; depositing a porous silica layer over the germania-doped porous soot preform; doping the germania-doped porous soot preform and the porous silica layer with a fluorine dopant in the a furnace to form a co-doped soot preform having a core region and a fluorine-doped trench region; and consolidating the co-doped porous soot preform to form a sintered glass, co-doped core preform having a refractive index alpha profile between 1.9 and 2.2 measured at 850 nm. Further, the step of doping the germania-doped soot preform and the porous silica layer with a fluorine dopant is conducted such that a doping parameter, $\Phi$, is between 20 and 300, and given by:

$$\Phi = \frac{1 \times 10^{14} R_{pre}^2 \exp(-E/RT_{dop}) T_{dop}^{1/2}}{x^{3/4}},$$

where $T_{dop}$ is the doping temperature, x is the partial pressure of the fluorine dopant in the furnace during the doping step, E is the activation energy of the doping step, R is the universal gas constant, and $R_{pre}$ is the thickness of the germania-doped porous soot preform.

Certain aspects of the method of making a co-doped core preform and trench for a multi-mode optical fiber can be conducted with a doping parameter, $\Phi$, set between 20 and 300, in some embodiments between 40 and 250, and in other embodiments between 45 and 225.

A further aspect of the present disclosure relates to a method of making a multi-mode optical fiber that includes the steps: depositing a porous soot comprising germania-doped silica to form a germania-doped porous soot preform; depositing a porous silica layer over the germania-doped porous soot preform; doping the germania-doped porous soot preform and the porous silica layer with a fluorine dopant in a furnace to form a co-doped soot preform having a core region and a fluorine-doped trench region; consolidating the co-doped soot preform to form a sintered glass, co-doped core preform having a refractive index alpha profile between 1.9 and 2.2 measured at 850 nm; depositing a cladding comprising silica over the sintered glass, co-doped core preform to form a multi-mode optical fiber preform; drawing the optical fiber preform into a multi-mode optical fiber. Further, the step of doping the germania-doped soot preform and the porous silica layer with a fluorine dopant is conducted such that a doping parameter, $\Phi$, is between 20 and 300, and given by:

$$\Phi = \frac{1 \times 10^{14} R_{pre}^2 \exp(-E/RT_{dop}) T_{dop}^{1/2}}{x^{3/4}},$$

where $T_{dop}$ is the doping temperature, x is the partial pressure of the fluorine dopant in the furnace during the doping step, E is the activation energy of the doping step, R is the universal gas constant, and $R_{pre}$ is the radial thickness of the germania-doped porous soot preform.

Certain aspects of the method of making a multi-mode optical fiber can be conducted with a doping parameter, $\Phi$, set between 20 and 300, in some embodiments between 40 and 250, and in other embodiments between 45 and 225.

Aspects of the foregoing methods can employ an outside vapor deposition (OVD) or a vapor-phase axial deposition (VAD) process during the step of depositing a porous soot comprising germania-doped silica to form a germania-doped porous soot preform and/or depositing a porous silica layer over the germania-doped porous soot preform.

In some aspects, the foregoing methods can include an additional step of treating the germania-doped porous soot preform with a dehydration agent (e.g., $Cl_2$ gas) between about 1000° C. and about 1200° C. For example, the treating step can conducted at about 1000° C., 1025° C., 1050° C., 1075° C., 1100° C., 1125° C., 1150° C., 1175° C., 1200° C., and all temperatures between these values. In some embodiments, the step of treating the preform with the dehydration agent preferably occurs prior to the consolidating step.

In other aspects, the step of doping the germania-doped porous soot preform with a fluorine dopant can be conducted at a doping temperature between about 1250° C. and about 1350° C. For example, step of doping with the fluorine dopant can be conducted at about 1250° C., 1260° C., 1270° C., 1280° C., 1290° C., 1300° C., 1310° C., 1320° C., 1330° C., 1340° C., 1350° C., and all temperatures within these doping temperatures. Preferably, the step of doping the germania-doped porous soot preform with the fluorine dopant is conducted at a doping temperature ($T_{dop}$) as governed by the doping parameter, $\Phi$.

In another aspect of the foregoing methods, the sintered glass preform has a fluorine-doped profile having an alpha parameter, $\alpha_{fluorine}$, given by $0.8 \leq \alpha_{fluorine} \leq 2.4$. In further aspects, sintered glass preform further comprises a germania-doped profile having an alpha parameter, $\alpha_{germania}$, such that $0.8 \leq \alpha_{germania}$, $\alpha_{fluorine} \leq 2.4$. In some embodiments, the two alpha parameters are substantially equivalent or within about ±10% of one another. In other aspects, the two alpha parameters are not equivalent. In additional aspects of the foregoing methods, the step of doping with the fluorine dopant is conducted such that the concentration of fluorine at the centerline of the co-doped core preform is essentially zero, and the concentration of fluorine increases with radius to the other radius of the co-doped core preform according to the alpha parameter, $\alpha_{fluorine}$.

Certain aspects of the foregoing methods can be employed to produce a wide-band, multi-mode optical fiber (MMF) that is characterized by a root mean squared (RMS) pulse broadening that varies by no more than ±25% across an operating window of 0.4 µm or greater, the operating window within a wavelength range of 0.5 µm to 1.7 µm. Other aspects of the methods can produce wide-band, MMFs characterized by an RMS pulse broadening that varies by no more than ±25% across an operating window of about 0.1 µm or greater, 0.15 µm or greater, 0.2 µm or greater, 0.25 µm or greater, 0.3 µm or greater, 0.35 µm or greater, 0.4 µm or greater, 0.45 µm or greater, and even up to 0.5 µm or greater.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
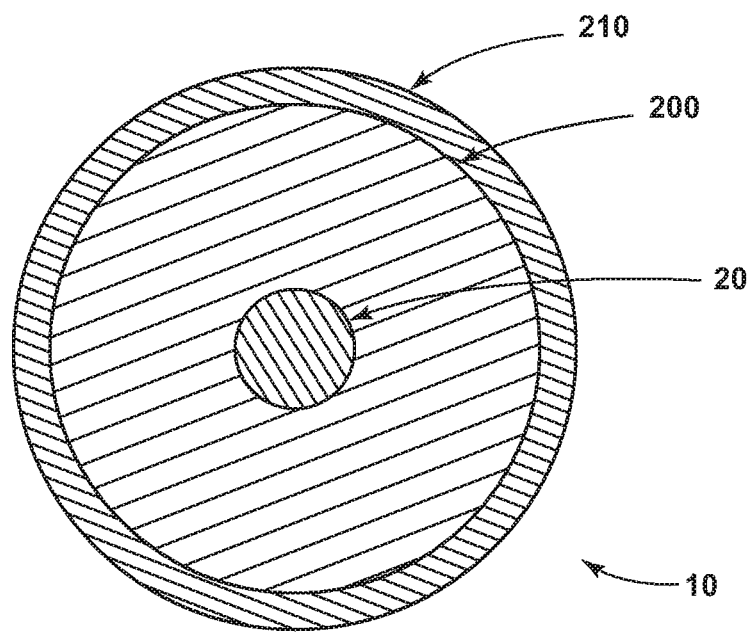
FIG. 1 schematically illustrates a cross-sectional view of a multi-mode optical fiber.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The terms "µm" and "micron" are used interchangeably herein.

The "relative refractive index percent" is defined in Equation (1) below as:

$$\Delta\% = 100 \times (n_i^2 - n_c^2)/2n_i^2 \quad (1)$$

where $n_c$ is the refractive index of undoped silica and $n_i$ is the average refractive index at point i in the particular region of the optical fiber.

As further used herein, the relative refractive index is represented by $\Delta$ (and $\delta$), and its values are given in units of "%," unless otherwise specified. The terms $\Delta$, % $\Delta$, $\Delta$ %, delta index, percent index, percent delta index and % can be used interchangeably herein. In cases where the refractive index of a region is less than the refractive index of undoped silica, the relative index percent is negative and is referred to as having a depressed region or depressed index. In cases where the refractive index is greater than the refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Further, the terms "germania," "Ge" and "$GeO_2$" are used interchangeably herein and refer to $GeO_2$. Examples of down-dopants include F and B. Further, the terms "fluorine" and "F" are used interchangeably to denote a fluorine dopant originating from a fluorine dopant precursor including but not limited to $CF_4$, $SiF_4$ and $C_2F_6$.

As also used herein, the terms "blanks," "preforms," and "optical preforms" are interchangeable and refer to an article comprising doped or undoped silica that can be used to make an optical fiber in optical fiber manufacturing. The term "soot" refers to doped or undoped silica particles having a diameter in the range of about 5 nm to about 5 microns. Soot preforms can comprise soot having a surface area of $\geq 2$ $m^2/g$. In some embodiments, the soot preforms comprise soot having a surface area of $\geq 5$ $m^2/g$; in some embodiments, the soot has a surface area of $\geq 20$ $m^2/g$; in some embodiments, the soot has a surface area of $\geq 50$ $m^2/g$; in some embodiments, the soot has a surface area of $\geq 200$ $m^2/g$; and, in some embodiments, the soot has a surface area of $\geq 2$ $m^2/g$ and $\leq 50$ $m^2/g$. Soot preforms can comprise soot having a bulk density of $\geq 0.1$ $g/cm^2$; in some embodiments, the soot has a bulk density of $\geq 0.2$ $g/cm^2$; in some embodiments, the soot has a bulk density of $\geq 0.5$ $g/cm^2$; in some embodiments, the soot has a bulk density of $\geq 1$ $g/cm^2$; and, in some embodiments, the soot has a bulk density of $\geq 0.2$ $g/cm^2$ and $\leq 1$ $g/cm^2$.

The term "alpha" or "$\alpha$-profile" refers to a relative refractive index profile, expressed in terms of $\Delta(r)$. $\Delta(r)$ is in units of "%," where r is radius, and follows Equation (2) as follows:

$$\Delta(r) = \Delta_{1max}\left[1 - \left(\frac{r}{r_1}\right)^{\alpha}\right] \quad (2)$$

where $\Delta_{1max}$ is the peak refractive index change in the center of the fiber or fiber preform (i.e., core delta), and $r_1$ is the core radius. Unless otherwise specified, alpha as reported herein is a refractive index profile measured at 850 nm. An $\alpha=1$ corresponds to a triangular relative refractive index profile, an $\alpha=2$ describes a parabolic profile, and $\alpha>12$ corresponds to a profile approaching a step index (i.e., a "step-like index profile" as used herein) profile. Accordingly, $\alpha=\infty$ corresponds to a pure step-index profile. Further, the alpha parameter, $\alpha$, used to characterize the relative refractive index profile in the core, can be understood to be the collective representation of two alpha parameters components, $\alpha_1$ and $\alpha_2$, when the core is doped with two dopants, dopant 1 and dopant 2 (e.g., germania and fluorine).

In soot and/or glass preforms, radial concentration profiles of dopants such as $GeO_2$, $Al_2O_3$, $P_2O_5$, $TiO_2$, F, Cl, and Br (referred to in general in Equation 2A below as dopant x), can be measured by an electron microprobe according to methods understood by those with ordinary skill in the field of this disclosure. The alpha of each dopant (e.g., $\alpha_{dopant1, 2, 3 \ldots}$) can be calculated from a concentration profile in weight percent for each dopant as given below in Equation (2A).

$$C_{dx}(r) = C_{dxmax}\left[1 - \left(\frac{r}{r_1}\right)^{\alpha_{dopant x}}\right] \quad (2A)$$

Where $C_{dx}$ is the concentration of each dopant x, $C_{dxmax}$ is the maximum concentration for each dopant in the core, r is the radius, $r_1$ is the core radius and $\alpha_{dopantx}$ is the alpha parameter of each dopant x.

As used herein, "root mean square pulse broadening" or "RMS pulse broadening" refers to the degree of pulse broadening (e.g., in units of ns/km) at a given wavelength, at or away from the wavelength corresponding to the bandwidth for a given fiber. Further, root mean square (RMS) pulse broadening is the result of RMS time delay in a multi-mode (MMF) optical fiber. More particularly, RMS pulse broadening, $\sigma$, is given by Equations (3) and (4):

$$\sigma^2 = \langle \tau^2 \rangle - \langle \tau \rangle^2 \quad (3)$$

$$\tau(m) = \frac{Lm_1}{c}\left(1 - B + \frac{\lambda}{2}\frac{n_1}{m_1}\frac{dB}{d\lambda}\right) \Big/ \sqrt{1-B} \quad (4)$$

where $\tau(m)$ is the time delay of mode m, L is the fiber length, $m_1$ is the material dispersion coefficient, $n_1$ is the refractive index value in the center of the core of the fiber, B is the normalized propagation constant, $\lambda$ is the wavelength, c is the velocity of light in a vacuum, and $<>$ denotes the average operation (as shown below in Equation (4A)). For a set of variables, $x_1, x_2, \ldots x_N$, the average of x is given by Equation (4A) as follows:

$$\langle x \rangle = \frac{\sum_{i=1}^{N} x_i}{N} \quad (4A)$$

As also used herein, "macrobend performance," "bend performance" and "bend loss" are terms that relate to measurements conducted according to FOTP-62 (JEC-60793-1-147) by wrapping 1 turn of the fiber on test around 10 mm diameter mandrel and measuring the increase in attenuation due to the bending using an encircled flux (EF) launch condition (this is also referred to as a restricted launch condition). The encircled flux is measured by launching an overfilled pulse into an input end of a 2 m length of InfiniCor® 50 micron core optical fiber which is deployed with a 1 wrap on a 25 mm diameter mandrel near the midpoint. The output end of the InfiniCor® 50 micron core optical fiber is spliced to the fiber on test, and the measured bend loss is the difference of the attenuation under the prescribed bend condition to the attenuation without the bend.

As also used herein, the term "bandwidth" is measured according to FOTP-204 using an overfilled launch condition. Further, the "bandwidth" (BW), as used herein, is equal to [1/(4·σ)]/1.34. The term "peak bandwidth" refers to the wavelength in nm where the bandwidth is at a maximum.

The manufacturing and processing methods in this disclosure for making core preforms for optical fibers and optical fibers as a whole are intended for wide-band, multi-mode optical fibers (MMFs). As used herein, the terms "wide-band, multi-mode optical fibers" and "wide-band MMFs" are used interchangeably and are indicative of multi-mode optical fibers having a bandwidth of at least 1 GHz-km at all wavelengths within a sub-window of at least 50 nm between a wavelength range of 700-1300 nm. In some embodiments, wide-band MMFs have a bandwidth of ≥2 GHz-km at all wavelengths within a sub-window of at least 100 nm between a wavelength range of 800-1200 nm. In some embodiments, wide-band MMFs have a bandwidth of ≥3 GHz-km at all wavelengths within a sub-window of at least 100 nm between a wavelength range of 800-1200 nm. In some embodiments, wide-band MMFs have a bandwidth of ≥5 GHz-km at all wavelengths within a sub-window of at least 100 nm between a wavelength range of 800-1200 nm. In some embodiments, wide-band MMFs have a bandwidth of ≥2 GHz-km at all wavelengths within a sub-window of at least 200 nm between a wavelength range of 800-1200 nm. In some embodiments, wide-band MMFs have a bandwidth of ≥3 GHz-km at all wavelengths within a sub-window of at least 200 nm between a wavelength range of 800-1200 nm. In some embodiments, wide-band MMFs have a bandwidth of ≥5 GHz-km at all wavelengths within a sub-window of at least 200 nm between a wavelength range of 800-1200 nm.

As used herein, "co-doping" refers to the introduction of two or more dopants into the core region and, in some cases, trench and inner cladding layers of an optical fiber. Optical fiber configurations with co-doped core regions, and the methods to develop such co-doped core regions, result in appreciable reductions in the viscosity of the core region, Rayleigh scattering effects and, ultimately, fiber attenuation. The co-doping methods herein can result in an effective index that is close to that of silica; consequently, typical doping levels can be employed in the cladding to effect wave-guide behavior consistent with the intended, multi-mode operation of the fiber.

Advantageously, wide-band, high bandwidth MMFs can be produced according to the methods of the disclosure by co-doping Ge and F in the core of the fiber to ensure that the resulting MMF is characterized by low bend losses. The use of dual dopants in the core region of the MMF with dual alpha parameters reduces sensitivity of an optimized operating window (i.e., a wavelength range) to particular operating wavelengths, thus contributing to the use of the MMF with a broader window or a dual-window. As outlined in the following, certain aspects of the disclosure include manufacturing-scalable methods of making core preforms and MMFs by doping the core regions with both germania and fluorine. Other aspects of the disclosure include manufacturing-scalable methods of making core preforms and MMFs in which the core region and a trench are doped in a single step prior to consolidation.

As depicted in FIG. 1, the multi-mode optical fiber 10 comprises a silica-based core 20 and a silica-based cladding layer (or cladding) 200 surrounding and directly adjacent (i.e. in contact with) the core. The fiber 10 can have a numerical aperture, NA, between 0.15 and 0.25, preferably between 0.185 and 0.215. Preferably, the bandwidth of the fiber 10 is greater than 2 GHz-km, where the peak bandwidth is centered on a wavelength within 700 nm and 1300 nm.

Figure 1A:
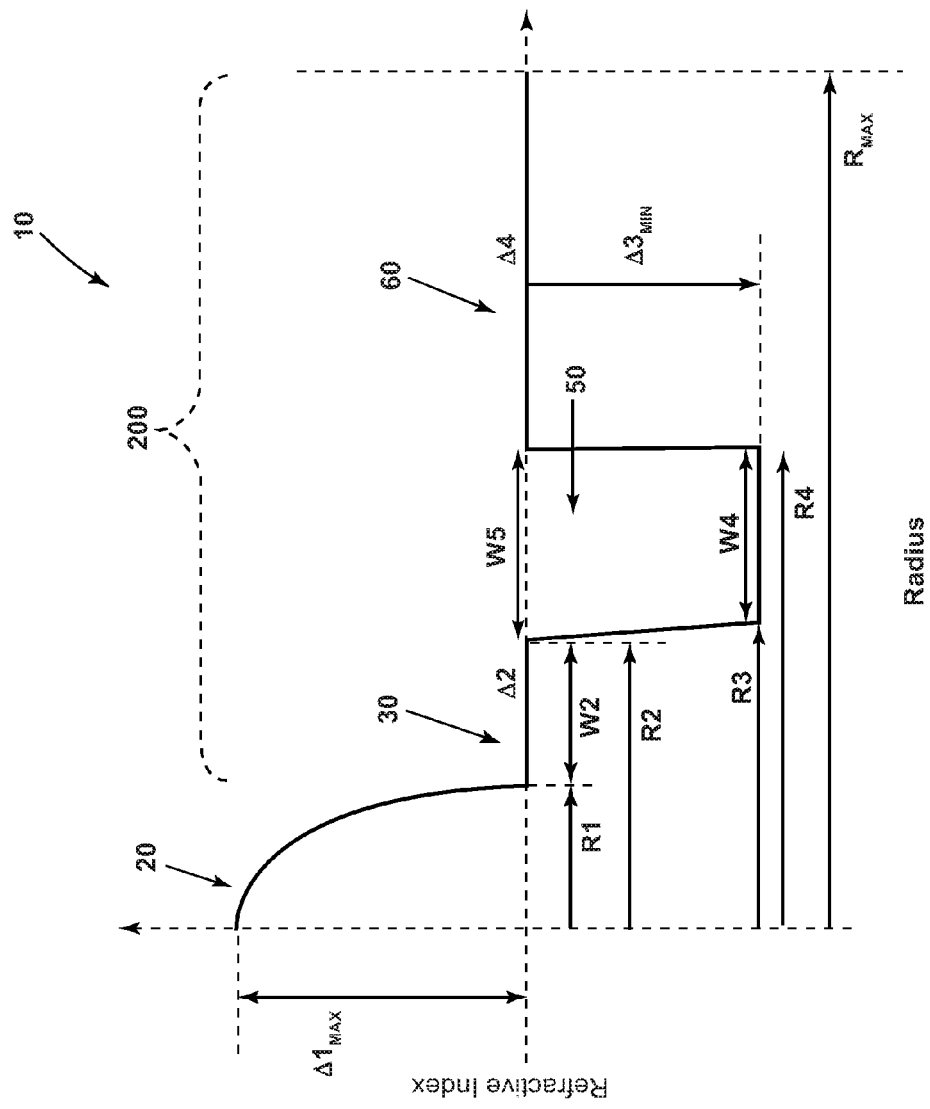
FIG. 1A depicts a schematic refractive index profile of the multi-mode optical fiber depicted in FIG. 1.

As shown in FIG. 1A, the core 20, having a maximum index, $\Delta 1_{MAX}$, of the multi-mode optical fiber 10 extends from a centerline at r=0 to an outermost core radius, R1, typically about 20 to 30 μm, and in some embodiments between 23.5 and 26.5 μm. The cladding 200 extends from the radius, R1 to an outermost cladding radius, $R_{MAX}$ and has a relative refractive index, $\Delta 4$. In some embodiments, the cladding 200 has an inner cladding 30 having a relative refractive index, $\Delta 2$, an outer radius, R2 and a width, W2=R2−R1. In some embodiments, the cladding 200 of the optical fiber 10 includes a silica-based region 50 having a relative refractive index, $\Delta 3_{MIN}$, a minimum radius, R3, an outer radius, R4, a maximum width, W5=R4−R2, and a minimum width, W4=R4−R3, surrounding the core and having a refractive index lower than that of silica by virtue of doping with a down-dopant. The silica-based cladding region 50 (interchangeably referred to in the disclosure as a "trench 50" and a "moat 50") may comprise, for example, F and optionally GeO$_2$. In some embodiments, this silica-based cladding region 50 includes random or non-periodically distributed voids (for example filled with gas). The trench region 50 comprises a refractive index that is lower than the refractive index of the outer cladding layer 60 (e.g., between R4 and $R_{MAX}$). In some embodiments, the silica-based region 50 extends through the entire cladding 200. In other embodiments, an outer cladding layer 60 surrounds the cladding region 50. In some embodiments, the cladding 200 of the optical fiber 10 includes a silica-based region 50 surrounding the core and having a refractive index, $\Delta 3_{MIN}$, which is lower than the relative refractive index of the outer cladding layer 60, $\Delta 4$. Also included in some embodiments of the fiber 10 (not shown in FIG. 1A) are primary and secondary polymer coatings that surround the fiber 10.

In some embodiments an optional silica based inner cladding layer 30 is situated between the core 20 and the silica-based region 50, typically containing a down-dopant. An exemplary schematic relative refractive index profile of the multi-mode optical fiber 10 is depicted in FIG. 1A. In some embodiments, the silica-based region 50 is offset from the core 20 by a width W2=R2−R1, and is configured such that the region 50 begins at r=R2 and ends at r=R3 with a width W3=R3−R2. In other embodiments the silica-based region 50 directly abuts the core 20, and may have a rectangular or a trapezoidal cross section.

Referring again to FIG. 1A, the cladding 200 extends from $R_1$ to an outermost cladding radius, $R_4$. In some embodiments, the cladding 200 comprises Ge—F co-doped silica (e.g., in the inner cladding layer 30). In some embodiments, the cladding 200 comprises F-doped silica (e.g., in the trench region 50). For example, in some embodiments the trench region 50 is surrounded, by a silica-based outer cladding layer 60 (e.g., a pure silica outer cladding layer or an up-doped silica-based outer cladding layer). In some embodiments, the cladding 200 is surrounded by one or more coatings 210 (see FIG. 1), for example by an acrylate polymer.

In aspects of the multi-mode optical fiber 10 (see FIGS. 1 and 1A) with a silica-based core doped with germania and fluorine, the index profile can be described by Equation (5):

$$n_1^2(r) = n_0^2(1 - 2\Delta_1 r^{\alpha_1} - 2\Delta_2 r^{\alpha_2}) \quad (5)$$

where $\Delta_1$ and $\Delta_2$ are the relative (with respect to pure silica) refractive index changes due to dopants 1 and 2, respectively. Note that for a core 20 of a fiber 10 that is co-doped with fluorine and germania, the two alpha parameters, $\alpha_1$ and $\alpha_2$, can be given by $\alpha_{germania}$ and $\alpha_{fluorine}$. For an optimized profile, $\alpha_1$ and $\alpha_2$ satisfy the following conditions in Equation (6):

$$\alpha_i = 2 - 2\frac{n_0}{m_0}\frac{\lambda}{\Delta_i}\frac{d\Delta_i}{d\lambda} - \frac{12}{5}\Delta \quad i = 1, 2 \quad (6)$$

where $\Delta = \Delta_1 + \Delta_2$ and $n_0$ is the index at the center $r=0$, and $m_0$ is the material dispersion at $n_0$. Further, we introduce two parameters, $x_1$ and $x_2$, to describe the relative index changes in the following Equations (7) an (8):

$$\Delta_1 = \frac{(\delta_{a1} - \delta_{a2})(1 - x_1) + (\delta_{b1} - \delta_{b2})x_2}{2n_0^2} \quad (7)$$

$$\Delta_2 = \frac{(\delta_{a1} - \delta_{a2})x_1 + (\delta_{b1} - \delta_{b2})(1 - x_2)}{2n_0^2} \quad (8)$$

where $$\delta_{a1} = n_{a1}^2 - n_s^2 \quad (9)$$

$$\delta_{a2} = n_{a2}^2 - n_s^2 \quad (10)$$

$$\delta_{b1} = n_{b1}^2 - n_s^2 \quad (11)$$

$$\delta_{b2} = n_{b2}^2 - n_s^2 \quad (12)$$

and where $n_{a1}$ and $n_{b1}$ are the refractive indices in the center of the fiber core corresponding to dopants 1 and 2, respectively (e.g., $GeO_2$ and F); $n_{a2}$ and $n_{b2}$ are the refractive indices at the edge of fiber core corresponding to dopants 1 and 2, respectively; and $n_s$ is the refractive index of pure silica. Further, as shown in Equation (13):

$$n_0^2 = n_{a1}^2 + n_{b1}^2 - n_s^2 \quad (13)$$

Using the Equations above, the dopant concentration profiles in the fiber (e.g., multi-mode fiber 10) can be expressed in Equations (14) and (15) as follows:

$$C_a(r) = C_{a1} - (C_{a1} - C_{a2})(1 - x_1)r^{\alpha_1} - (C_{a1} - C_{a2})x_1 r^{\alpha_2} \quad (14)$$

$$C_b(r) = C_b - (C_{b1} - C_{b2})x_2 r^{\alpha_1} - (C_{b1} - C_{b2})(1 - x_2)r^{\alpha_2} \quad (15)$$

where $C_{a1}$ and $C_{b1}$ are the dopant concentrations in the center of the fiber core corresponding to dopants 1 and 2, respectively, $C_{a1}$ and $C_{b1}$ are the dopant concentrations at the edge of fiber core corresponding to dopants 1 and 2, respectively and where $x_1$ and $x_2$ are parameters for the first and second dopant (e.g., $GeO_2$ and F), respectively, that are weighting factors that describe the contributions of dual dopants on the dopant concentration radial profile. The values for parameters $x_1$ and $x_2$ are selected such that concentrations of the two dopants are always positive. Further, dopant concentrations can be expressed in units of "mole %" (interchangeably used herein as "mol %") or can be converted to "weight %" (interchangeably used herein as "wt. %").

Figure 2A:
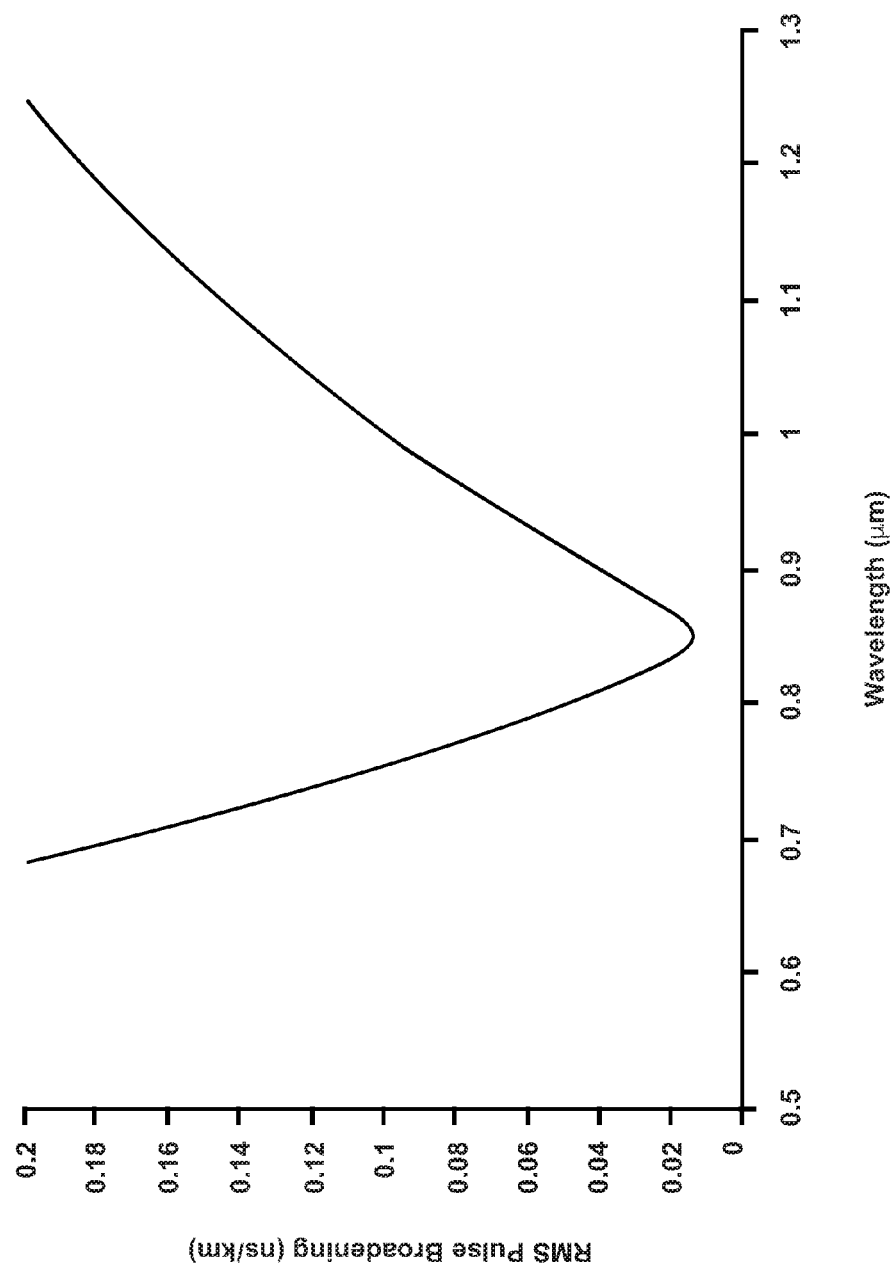
FIG. 2A shows the root mean square (RMS) pulse broadening as a function of wavelength for the fiber depicted in FIG. 1 having a graded index core with a single, germania dopant.

Referring to FIG. 2A, the root mean square (RMS) pulse broadening as a function of wavelength is shown for a comparative fiber (i.e., characterized by a design and relative refractive index profile consistent with the fiber 10 depicted in FIGS. 1 and 1A) that includes a graded index core with a +1% delta comprising a single, germania dopant and optimized for operating at 0.85 μm. In particular, FIG. 2A shows RMS pulse broadening (ns/km) as a function of wavelength for the comparative fiber and demonstrates that RMS pulse broadening increases significantly for wavelengths above and below 0.85 μm. For example, the pulse width at 0.88 μm is about twice the pulse width at 0.85 μm, which means that the bandwidth is reduced by a factor of 2 at wavelengths of ±0.03 μm from the peak bandwidth location.

As noted earlier, two dopants, Ge and F, can be employed in the core 20 of the multi-mode fiber 10 to significantly reduce the RMS pulse broadening sensitivity observed in the comparative fiber depicted in FIG. 2A. Using the foregoing Equations (1)-(15) for a fiber 10 having a co-doped core 20 with Ge and F dopants, RMS pulse broadening can be calculated for various fiber designs by varying the $x_1$ and $x_2$ parameters. To determine RMS pulse broadening, the waveguide equation is solved with the refractive index profile described by Equations (5)-(15) to obtain the normalized propagation constant, B, for each mode, m. In particular, the time delay, $\tau(m)$, for each mode, m, is calculated using Equation (4). Once the time delays for all of the modes are known, the RMS pulse broadening is calculated using Equation (3). By changing the parameters $x_1$ and $x_2$, different doping profiles can be obtained for the Ge and F dopants. Pulse broadening was modeled as a function of wavelength for several exemplary embodiments of germania and fluorine co-doped MMF fibers with varying $x_1$ and $x_2$ parameters in which the core delta was held constant at +1%, the $GeO_2$ concentration at the center of the core 20 (i.e., $C_{a1}$) was assumed to be 16.2 wt. %, and the F concentration at the edge of the core (i.e., $C_{b2}$ at $R_1$) was held constant at 2 wt. %. In particular, the $x_1$ and $x_2$ parameters were varied from −10 to +10. Based on this modeling work, it is apparent that the operating window of co-doped MMFs can be broadened by adjusting the profile design, particularly by the addition of F in complex non-linear profiles within the core 20 as a co-dopant with $GeO_2$. Varying the $x_1$ and $x_2$ parameters given in the foregoing Equations while holding the $GeO_2$ concentration at the center of the core (i.e., $C_{a1}$) and the F concentration at the outer radius of the core (i.e., $C_{b2}$) constant can result in two wavelengths in which the RMS pulse broadening is at a minimum level—i.e., two RMS pulse broadening minima.

Figure 2B:
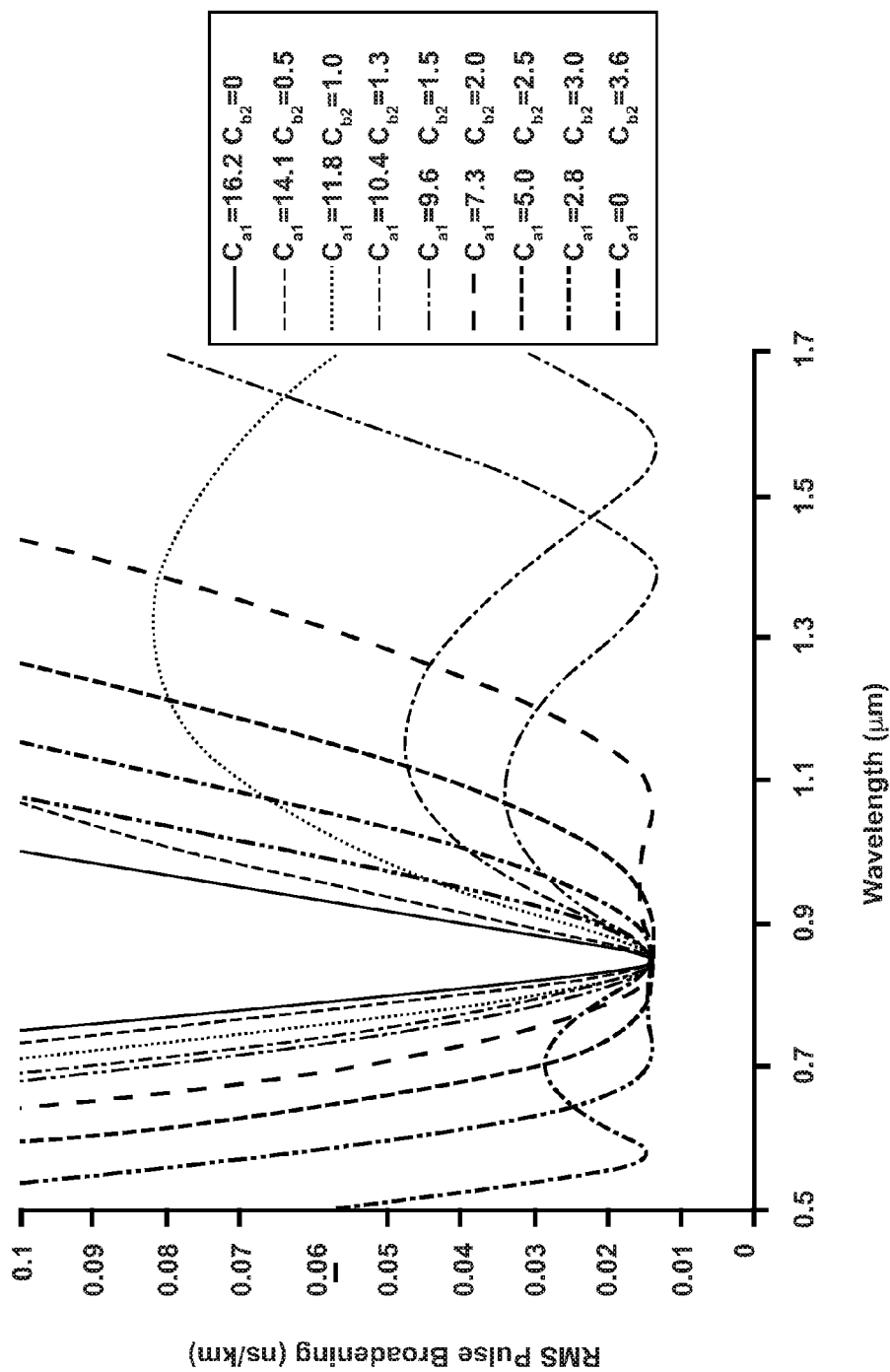
FIG. 2B shows the root mean square (RMS) pulse broadening as a function of wavelength for several exemplary embodiments of Ge and F co-doped fibers with various doping levels.

As shown in FIG. 2B, it is possible to vary the concentrations of $GeO_2$ at the core centerline and F at the outer radius of the core such that the first RMS pulse broadening minima is set at about 850 nm. That is, each of the RMS pulse broadening plots shown in FIG. 2B depicts a fiber having a unique combination of $GeO_2$ concentration at the core centerline and F concentration at the outer radius of the core, while having one RMS pulse broadening minima at about 850 nm. Further, as the concentration of F is increased at the outer radius of the core (i.e., $C_{b2}$), the second minima moves toward the first minima. When the two minima are relatively close to one another, the minima merge and the result is broadened operating wavelength in which RMS pulse broadening remains relatively low over a greater range of wavelengths. For instance, the condition depicted in FIG. 2B in which the core centerline is doped with $GeO_2$ at about 7.3 wt. % (i.e., $C_{a1}$) and the outer radius of the core is characterized with a F concentration of about 2.0 wt. % (i.e., $C_{b2}$) results in two RMS pulse broadening minima at about 850 and 1100 nm, thus resulting in an operating window of about 250 nm in size in which RMS pulse broadening is relatively constant at a minimum.

Figure 3A:
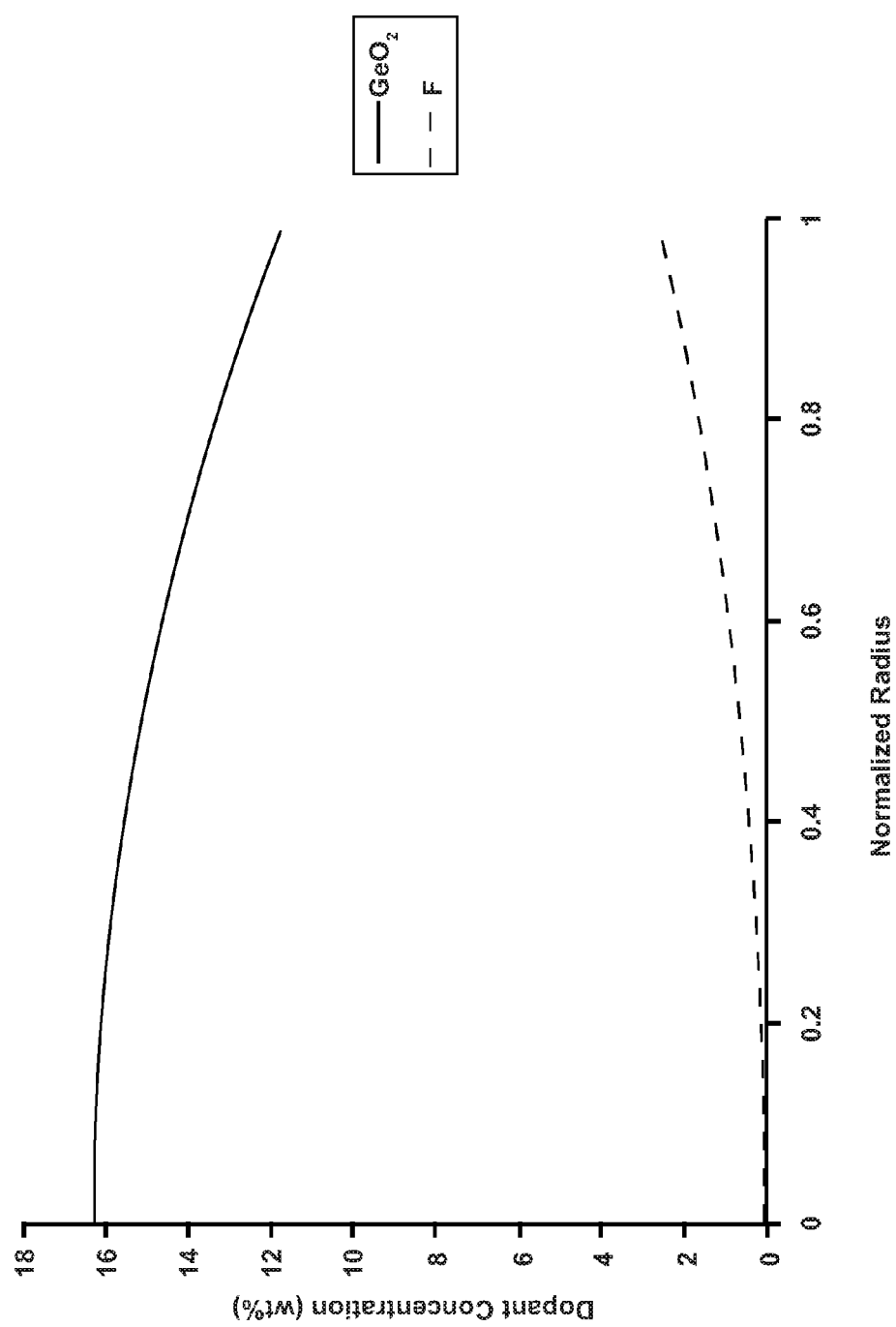
FIG. 3A is a plot of $GeO_2$ and F concentration in a co-doped multi-mode optical fiber optimized for operation at a wavelength of 850 nm.
Figure 3B:
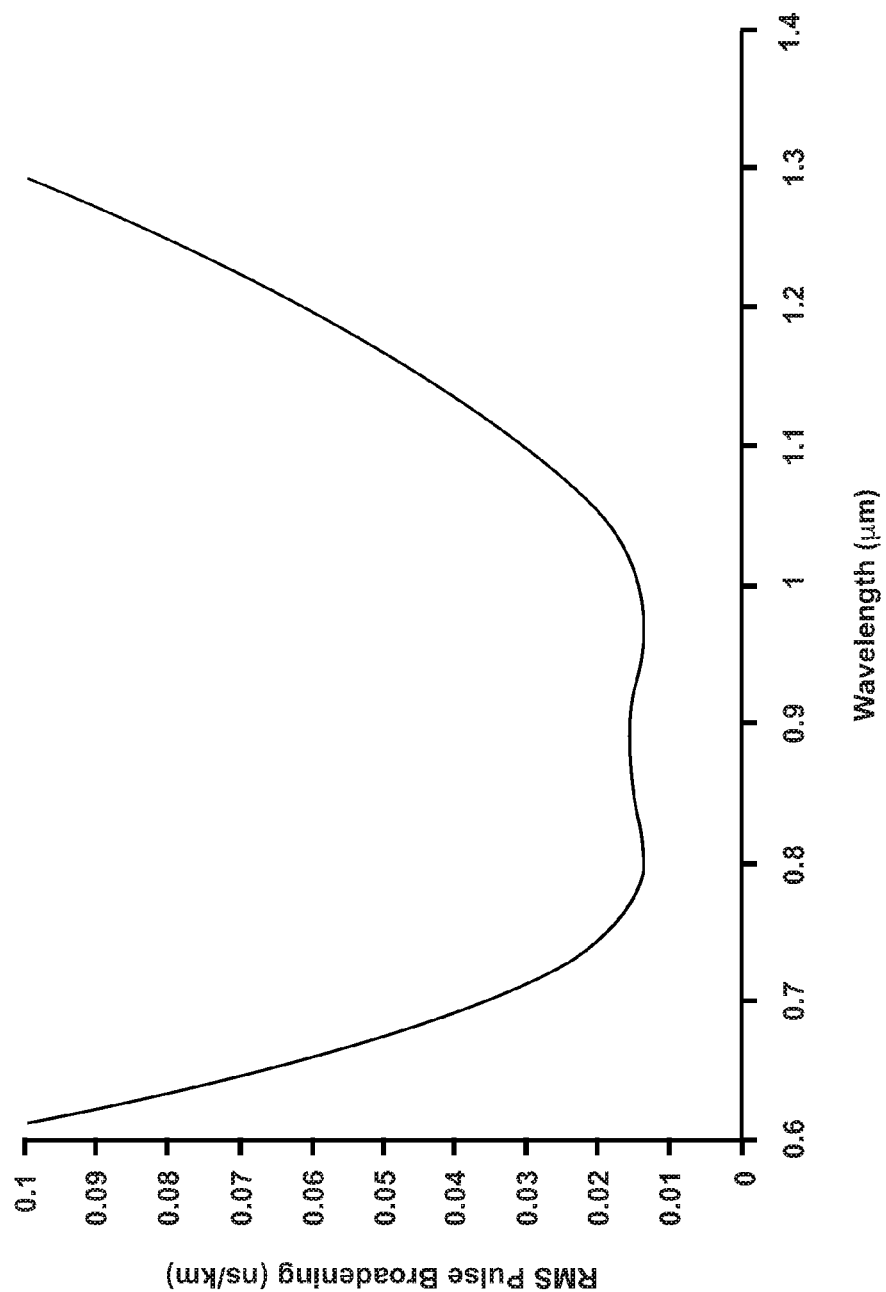
FIG. 3B shows the root mean square (RMS) pulse broadening as a function of wavelength for the fiber depicted in FIG. 3A.

Referring to FIG. 3A, a plot is provided of $GeO_2$ and F concentration for a co-doped multi-mode optical fiber optimized for operation at a wavelength of 850 nm. For this fiber design, $\alpha_1$ and $\alpha_2$ (i.e., $\alpha_{germania}$ and $\alpha_{fluorine}$, respectively)

were set at 2.0708. As shown in FIG. 3B, the root mean square (RMS) pulse broadening as a function of wavelength for this fiber demonstrates excellent wide band performance. In particular, the RMS pulse broadening for this fiber is relatively constant at about 0.15 ns/km in a range from about 800 nm to about 1025 nm. As such, this fiber has an operating window with a range of about 225 nm (see FIG. 3B), which is about a six times larger window at a similar RMS pulse broadening than the comparative fiber with a core containing only a $GeO_2$ dopant (see FIG. 2A).

The foregoing Equations and co-doped fiber design principles can be employed to fiber designs exhibiting a wide-band, multi-mode optical fiber (MMF) (e.g., multi-mode fiber 10 as depicted in FIGS. 1 and 1A) characterized by a root mean squared (RMS) pulse broadening that varies by no more than ±25% across an operating window of 0.4 μm or greater, the operating window within a wavelength range of 0.5 μm to 1.7 μm. Preferably, these MMFs can be characterized by a set of RMS pulse broadening minima that varies by no more than ±25% across an operating wavelength window of about 0.1 μm or greater, 0.15 μm or greater, 0.2 μm or greater, 0.25 μm or greater, 0.3 μm or greater, 0.35 μm or greater, 0.4 μm or greater, 0.45 μm or greater, and even up to 0.5 μm or greater.

In certain aspects, the wide-band, co-doped MMFs (e.g., multi-mode optical fiber 10 as depicted in FIGS. 1 and 1A) have a bandwidth at a wavelength of 850 nm of greater than 4000 MHz-km and a bandwidth at a wavelength of 950 nm of greater than 3000 MHz-km. In some embodiments, the MMFs have bandwidth at a wavelength of 850 nm of greater than 4000 MHz-km and a bandwidth at a wavelength of 1050 nm of greater than 3000 MHz-km.

Further, some aspects of these co-doped MMFs (e.g., multi-mode optical fiber 10 as depicted in FIGS. 1 and 1A) exhibit a bend loss of less than 0.25 dB/turn for a mandrel diameter of 15 mm. Certain embodiments of these co-doped MMFs exhibit a bend loss of less than 0.24 dB/turn, less than 0.23 dB/turn, less than 0.22 dB/turn, less than 0.21 dB/turn, less than 0.20 dB/turn, less than 0.19 dB/turn, less than 0.18 dB/turn, less than 0.17 dB/turn, less than 0.16 dB/turn, and less than 0.15 dB/turn, for example. Further, certain embodiments of these co-doped MMFs have a numerical aperture, NA, between about 0.185 to about 0.215.

According to some embodiments in the disclosure, the two alpha parameters, $\alpha_{germania}$ and $\alpha_{fluorine}$, of these wide-band, co-doped MMFs (e.g., multi-mode optical fiber 10 as depicted in FIGS. 1 and 1A) can be given by $1.8 \leq \alpha_{germania}$, $\alpha_{fluorine} \leq 2.4$. The two alpha parameters can be substantially equivalent, or within about ±10% of one another. In other embodiments, the two alpha parameters are not equivalent, but within the range of about 1.8 to about 2.4.

While the co-doped, multi-mode fiber depicted in FIGS. 3A and 3B demonstrates excellent wide-band performance, the $GeO_2$ and F concentration profiles are complex, non-uniform profiles making the processing of this fiber, along with other co-doped multi-mode fibers consistent with the foregoing wide-band principles, very difficult, particularly from the standpoint of optical fiber manufacturing. Notably, the controlled addition of fluorine as a co-dopant in a varying concentration through the radius of a $GeO_2$-doped core preform is complicated by various competing time-dependent factors including: the fluorine diffusivity through the preform; the reaction rate of the fluorine dopant precursor with the silica-based core preform; and sintering of the core preform. Further, fiber preform sizes are variable in manufacturing (e.g., to produce optical fibers of various lengths during drawing processes), which also influences these time-dependent factors. The net result is that co-doped, wide-band multi-mode optical fibers have been difficult to produce with repeatable dual, dopant concentration profiles with conventional processing approaches. As such, fibers drawn from these preforms would have markedly different dopant concentration profiles in their respective cores resulting in significant RMS pulse broadening differences.

More particularly, the nature of the obtained radial concentration profiles associated with fluorine doping during fiber preform consolidation depend on the relative rates of sintering, the gas-solid reaction of the fluorine dopant precursor with the preform and the diffusion of the fluorine dopant precursor through the preform. A detailed model of the relative contribution of each of these processes on the ultimate fluorine doped profile is given by Equation (16):

$$\frac{\partial C(r,t)}{\partial t} = \frac{D(r,t)\frac{\partial^2 C(r,t)}{\partial r^2}}{\left[1+\frac{\{1-\varepsilon(r,t)\}}{\varepsilon(r,t)}\frac{K_{eq}}{4\{C(r,t)\}^{3/4}}\right]} + \frac{1}{\varepsilon(r,t)}\frac{\partial C(r,t)}{\partial r}\frac{\partial}{\partial r}[\varepsilon(r,t)D(r,t)]\frac{1}{\left[1+\frac{\{1-\varepsilon(r,t)\}}{\varepsilon(r,t)}\frac{K_{eq}}{4\{C(r,t)\}^{3/4}}\right]} + \frac{1}{\left[1+\frac{\{1-\varepsilon(r,t)\}}{\varepsilon(r,t)}\frac{K_{eq}}{4\{C(r,t)\}^{3/4}}\right]}\frac{1}{r(t)}D(r,t)\frac{\partial C(r,t)}{\partial r} \quad (16)$$

where D is the diffusion coefficient of the fluorine dopant (e.g., $SiF_4$) through the porous preform, C is the gas molar concentration of the fluorine dopant, ε is the porosity of the preform blank which changes with time because of sintering, t is the time, r is the radial position, and $K_{eq}$ is the local thermo-chemical equilibrium constant. Further, moles of fluorine (F) per unit of solid preform volume can then be calculated, using the local equilibrium assumption as follows in Equation (17):

$$S(r,t) = K_{eq}[C(r,t)]^{1/4} \quad (17)$$

where S is the molar concentration of fluorine (F) in the glass. Equation (16) above is instructive in the form presented as it aids in understanding the effect of the chemical gas-solid reaction of the fluorine dopant precursor and the silica-based preform on the effective diffusion coefficient of the fluorine species diffusing through the porous silica-based preform. As a result of this chemical reaction, the effective diffusion coefficient, $D_{eff}$, is smaller than the actual diffusion coefficient, D, by a factor given by the denominator in the first term on the right-hand side of Equation (16), and is given by Equation (18) below:

$$D_{eff} = \frac{D}{1+\frac{(1-\varepsilon)}{\varepsilon}\frac{K_{eq}}{4C^{3/4}}} \quad (18)$$

The non-uniformity of the doped fluorine profile is a function of the non-dimensional doping parameter, ρ, which is the ratio of the preform sintering rate to the rate of effective diffusion (accounting for consumption of the fluorine dopant because of the reaction between the fluorine dopant and the germania-doped silica-based preform), or alternatively, as the ratio of the characteristic time of effective diffusion, $t_d$, to the characteristic time of sintering, $t_s$. The non-dimensional doping parameter, ρ, is given by Equation (19) below:

$$\rho = \frac{t_d}{t_s} \quad (19)$$

Further, the characteristic time of diffusion, $t_d$, allowing for the depletion of the diffusing species by the fluorine dopant gas/germania-doped silica preform chemical reaction is given below in Equation (20) as:

$$t_d = \frac{R_{prc}^2}{D_{eff}} \quad (20)$$

Where $R_{pre}$ is the thickness of the germania-doped silica preform being co-doped with the fluorine dopant and $D_{eff}$ is the effective diffusion coefficient from Equation (18) above. As it is believed that sintering of the preform is governed by surface energy-driven viscous flow sintering, the characteristic time of sintering, $t_s$, can be given by Equation (21) as follows:

$$t_s = \frac{\mu d_p}{\sigma} \quad (21)$$

where $d_p$ is the particle diameter, $\mu$ is the germania-doped silica particle viscosity and $\sigma$ is the germania-doped silica particle surface energy (e.g., of silica particles making up the silica-based preform). Since the denominator in Equation (18) is much greater than 1 for the conditions of doping a germania-doped silica-based preform with a fluorine dopant during or prior to complete consolidation of the preform, Equations (18) to (21) can be combined to provide Equation (22) as follows:

$$\rho = \frac{R_{prc}^2}{D} \frac{(1-\varepsilon)K_{eq}}{4\varepsilon C^{3/4}} \frac{\sigma}{\mu d_p} \quad (22)$$

As the equilibrium constant, $K_{eq}$, establishes the relationship between $S(r, t)$ and $C(r, t)$ in Equation (17), Equation (23) follows:

$$K_{eq} = A_1 \exp\left[-\frac{E_{eq}}{RT}\right]\left(\frac{RT}{P}\right)^{1/4} \frac{\rho_g}{(MW_F)(N_F)} \quad (23)$$

where $A_1$ is a pre-exponential constant (determined experimentally to be equal to 100 wt. %/atm$^{0.25}$), $E_{eq}$ is the activation energy (determined experimentally to be equal to 10800 kcal/mol), T is the temperature in K, R is the universal gas constant, P is the pressure during fluorine doping, $\rho_g$ is the density of the silica-based preform, $MW_F$ is the molecular weight of F, and $N_F$ are the number of fluorine molecules per molecule of the precursor dopants (e.g., $N_F$=4 for $SiF_4$ and $CF_4$ fluorine dopant precursors). Similarly, viscosity of the fluorine-doped, silica-based preform follows the relation given by Equation (24) as follows:

$$\mu = A \exp\left[\frac{E_\mu}{RT}\right] \quad (24)$$

where $E_\mu$ and A both are a function of the amount of fluorine doped into the silica-based preform. Using the relations that diffusion of the fluorine dopant precursor species through the germania-doped, silica-based preform is expected to scale with temperature to the power of ½, molar concentration of the dopant precursor scales with 1/T, and by substituting Equations (23) and (24) into Equation (22), a doping dimensional parameter, Φ, is defined that is proportional to the non-dimensional doping parameter, ρ, and obeys the relationship given by Equation (25):

$$\Phi = \frac{1 \times 10^{14} R_{prc}^2 \exp(-E/RT_{dop})T_{dop}^{1/2}}{x^{3/4}} \quad (25)$$

where E (in which $E=E_{eq}+E_\mu$) is the overall activation energy for the fluorine dopant precursor and silica-based preform reaction (e.g., during a step of doping the preform with fluorine), and x is the partial pressure of the fluorine dopant in silica (in atmospheres) at the outer surface of the preform. In the analysis and inventive examples disclosed below, E/R is 55750 degrees K (i.e., $E_{eq}$/R=5435 degrees K; and $E_\mu$/R=50315 degrees K). As such, a doping parameter, Φ, can be used to characterize a particular, desired fluorine doping profile for the core in a co-doped, wide band MMFs. Once the doping parameter, Φ, is calculated or otherwise determined for the fluorine dopant profile of a particular MMF, core preforms can be prepared according to Equation (25). For example, a particular partial pressure (x) of the fluorine dopant can be set at the outside radius of a germania-doped, silica-based core preform having a size given by $R_{pre}$, and then the proper doping temperature, $T_{dop}$, can be found using Equation (25). As the size of the core preform changes, the doping temperature, $T_{dop}$, can be adjusted according to Equation (25) and the doping parameter, Φ, to ensure that a repeatable consistent fluorine concentration profile is developed in the preform.

By employing the foregoing principles, a method of making co-doped core preforms for wide-band MMFs (e.g., multi-mode optical fiber 10 in FIGS. 1 and 1A) is provided. According to one aspect, a method of making a co-doped core preform for a multi-mode optical fiber that includes the steps: depositing a porous soot comprising silica to form a porous soot preform; and doping the porous soot preform with a germania dopant to form a germania-doped porous soot preform. In some aspects, the foregoing steps can be combined into a single step: depositing a porous soot comprising germania-doped silica to form a germania-doped porous soot preform. In certain embodiments, these deposition and doping steps can be conducted with an outside vapor deposition (OVD) and a vapor-phase axial deposition (VAD) process.

The method next includes a step of doping the germania-doped porous soot preform with a fluorine dopant in a furnace to form a co-doped soot preform. A further step of the method includes consolidating the co-doped soot preform (e.g., at above about 1450° C.) to form a sintered glass, co-doped core preform having a refractive index alpha profile between 1.9 and 2.2 measured at 850 nm. Further, the step of doping the germania-doped soot preform with a fluorine dopant is conducted such that a doping parameter, Φ, is between 20 and 300, and given by:

$$\Phi = \frac{1 \times 10^{14} R_{prc}^2 \exp(-E/RT_{dop})T_{dop}^{1/2}}{x^{3/4}},$$

where $T_{dop}$ is the doping temperature, x is the partial pressure of the fluorine dopant in the furnace during the doping step, E is the activation energy of the doping step, R is the universal gas constant, and $R_{pre}$ is the thickness of the germania-doped porous soot preform. As outlined earlier in the description of Equation (25), the doping parameter, Φ, along with the particular preform size (i.e., given by $R_{pre}$) and partial pressure of the fluorine dopant at the outer radius of the preform (x), can be employed to set the doping temperature, $T_{dop}$, according to the method.

In some aspects, the foregoing method can include an additional step of treating the germania-doped porous soot preform with a dehydration agent (e.g., $Cl_2$ gas) between about 1000° C. and about 1200° C. For example, the treating step can conducted at about 1000° C., 1025° C., 1050° C., 1075° C., 1100° C., 1125° C., 1150° C., 1175° C., 1200° C., and all temperatures between these values.

In other aspects, the step of doping the germania-doped porous soot preform with a fluorine dopant can be conducted at a doping temperature between about 1250° C. and about 1350° C. For example, step of doping with the fluorine dopant can be conducted at about 1250° C., 1260° C., 1270° C., 1280° C., 1290° C., 1300° C., 1310° C., 1320° C., 1330° C., 1340° C., 1350° C., and all temperatures within these doping temperatures. Preferably, the step of doping the germania-doped porous soot preform with the fluorine dopant is conducted at a doping temperature ($T_{dop}$) as governed by the doping parameter, Φ.

Also by employing the foregoing principles, a method of making a co-doped core preform and trench for wide-band MMFs (e.g., multi-mode optical fiber 10 in FIGS. 1 and 1A) is provided. According to an aspect, the method involves a single step of doping the core and trench. As such, the method includes the steps: depositing a porous soot comprising germania-doped silica to form a germania-doped, porous soot preform; and depositing a porous silica layer over the germania-doped porous soot preform. Aspects of the foregoing methods can employ an outside vapor deposition (OVD) or a vapor-phase axial deposition (VAD) process during the step of depositing a porous soot comprising silica to form a porous soot preform, doping the porous soot preform with a germania dopant and/or depositing a porous silica layer over the germania-doped porous soot preform.

The method next includes a step of doping the germania-doped porous soot preform and the porous silica layer with a fluorine dopant in a furnace to form a co-doped soot preform having a core region and a fluorine-doped trench region; and consolidating the co-doped soot preform (e.g., above about 1450° C.) to form a sintered glass, co-doped core preform having a refractive index alpha profile between 1.9 and 2.2 measured at 850 nm. Further, the step of doping the germania-doped soot preform and the porous silica layer with a fluorine dopant is conducted such that a doping parameter, Φ, is between 20 and 300, and given by:

$$\Phi = \frac{1 \times 10^{14} R_{pre}^2 \exp(-E/RT_{dop}) T_{dop}^{1/2}}{x^{3/4}},$$

where $T_{dop}$ is the doping temperature, x is the partial pressure of the fluorine dopant in the furnace during the doping step, E is the activation energy of the doping step, R is the universal gas constant, and $R_{pre}$ is the thickness of the germania-doped porous soot preform. As outlined earlier in the description of Equation (25), the doping parameter, Φ, along with the particular preform size (i.e., given by $R_{pre}$) and partial pressure of the fluorine dopant at the outer radius of the preform (x), can be employed to set the doping temperature, $T_{dop}$, according to the method.

EXAMPLES

Sintered glass, co-doped core preforms (i.e., doped with germania and fluorine) were made or modeled as follows. Soot preforms having a maximum at the centerline of 16 wt. % germania-doped silica (1% delta index vs. silica) with an alpha profile ($\alpha_{germania}$) of about 2.1 were dried at 1000° C. in a helium atmosphere comprising 3 volume % $Cl_2$ gas; doped in a fluorine-containing atmosphere, i.e., $SiF_4$ gas+He gas, for 90 minutes; and sintered by heating the preform at a heating rate of 2.5° C./min to 1475° C. in a helium atmosphere in order to produce the sintered glass, co-doped preforms listed in Tables 1A, 1B, 2A and 2B. The terms in Tables 1B and 2B "a" and "r" in the Penetration (a-r)/a column are as follows where, a=outer radius of consolidated glass preform and r=radial position which fluorine has penetrated. Further, in Table 1B, a "flat" fluorine profile shape means that the concentration of fluorine on the inside of the preform at its centerline is comparable to the concentration of fluorine on the outside of the preform. In Table 2B, a "triangular" fluorine profile shape means that the concentration of fluorine at the outside of the preform is significantly higher than the concentration of the fluorine at the centerline of preform, which approaches zero. Also note that "inner soot radius" in Tables 1A and 2A corresponds to a hole (as a result of removal of the bait rod).

TABLE 1A

| Comparative Example number | Core Soot Weight (g) | Soot Density (g/cm³) | Inner Soot Radius (cm) | Outer Soot Radius (cm) | Soot Thickness (cm) | Doping Temp [° C.] |
|---|---|---|---|---|---|---|
| Comp. Ex. 1 | 5000 | 0.338 | 0.476 | 6.88 | 6.40 | 1125 |
| Comp. Ex. 2 | 5000 | 0.338 | 0.476 | 6.88 | 6.40 | 1075 |
| Comp. Ex. 3 | 5000 | 0.338 | 0.476 | 6.88 | 6.40 | 1075 |
| Comp. Ex. 4 | 5000 | 0.65 | 0.476 | 4.97 | 4.50 | 1150 |
| Comp. Ex. 5 | 5000 | 0.65 | 0.476 | 4.97 | 4.50 | 1175 |
| Comp. Ex. 6 | 5000 | 0.65 | 0.476 | 4.97 | 4.50 | 1150 |

TABLE 1B

| Comparative Example number | $SiF_4$ partial pressure (atm) | Φ $(cm^2 \cdot K^{(1/2)})/atm^{(3/4)}$ | Fluorine Profile shape | Penetration, (a-r)/a | Max. F on outside of preform (wt. %) |
|---|---|---|---|---|---|
| Comp. Ex. 1 | 1 | 0.74 | Flat | 1 | 2.05 |
| Comp. Ex. 2 | 0.51 | 0.27 | Flat | 1 | 1.50 |
| Comp. Ex. 3 | 0.1 | 0.93 | Flat | 1 | 1.00 |
| Comp. Ex. 4 | 0.69 | 0.97 | Flat | 1 | 2.00 |
| Comp. Ex. 5 | 0.53 | 2.35 | Flat | 1 | 2.00 |
| Comp. Ex. 6 | 0.219 | 2.30 | Flat | 1 | 1.50 |

TABLE 2A

| Example number | Core Soot Weight (g) | Soot Density (g/cm³) | Inner Soot Radius (cm) | Outer Soot Radius (cm) | Soot Thickness (cm) | Doping Temp [° C.] |
|---|---|---|---|---|---|---|
| Ex. 1 | 5030 | 0.338 | 0.476 | 6.90 | 6.42 | 1300 |
| Ex. 2 | 5032 | 0.343 | 0.476 | 6.85 | 6.37 | 1280 |

TABLE 2A-continued

| Example number | Core Soot Weight (g) | Soot Density (g/cm³) | Inner Soot Radius (cm) | Outer Soot Radius (cm) | Soot Thickness (cm) | Doping Temp [° C.] |
|---|---|---|---|---|---|---|
| Ex. 3 | 5048 | 0.335 | 0.476 | 6.94 | 6.47 | 1250 |
| Ex. 4 | 5048 | 0.335 | 0.476 | 6.94 | 6.47 | 1225 |
| Ex. 5 | 5048 | 0.335 | 0.476 | 6.94 | 6.47 | 1225 |
| Ex. 6 | 4000 | 0.335 | 0.476 | 6.18 | 5.71 | 1258 |
| Ex. 7 | 6000 | 0.335 | 0.476 | 7.57 | 7.09 | 1244 |
| Ex. 8 | 7500 | 0.335 | 0.476 | 8.46 | 7.98 | 1237 |
| Ex. 9 | 5000 | 0.5 | 0.476 | 5.66 | 5.19 | 1264 |
| Ex. 10 | 5000 | 0.65 | 0.476 | 4.97 | 4.50 | 1273 |
| Ex. 11 | 4000 | 0.335 | 0.476 | 6.18 | 5.71 | 1288 |
| Ex. 12 | 6000 | 0.335 | 0.476 | 7.57 | 7.09 | 1273 |
| Ex. 13 | 7500 | 0.335 | 0.476 | 8.46 | 7.98 | 1265 |
| Ex. 14 | 5000 | 0.5 | 0.476 | 5.66 | 5.19 | 1294 |
| Ex. 15 | 5000 | 0.65 | 0.476 | 4.97 | 4.50 | 1304 |
| Ex. 16 | 4000 | 0.335 | 0.476 | 6.18 | 5.71 | 1308 |
| Ex. 17 | 6000 | 0.335 | 0.476 | 7.57 | 7.09 | 1293 |
| Ex. 18 | 7500 | 0.335 | 0.476 | 8.46 | 7.98 | 1285 |
| Ex. 19 | 5000 | 0.5 | 0.476 | 5.66 | 5.19 | 1315 |
| Ex. 20 | 5000 | 0.6 | 0.476 | 5.17 | 4.70 | 1321 |
| Ex. 21 | 5000 | 0.335 | 0.476 | 6.91 | 6.43 | 1220 |
| Ex. 22 | 4000 | 0.335 | 0.476 | 6.18 | 5.71 | 1227 |
| Ex. 23 | 6000 | 0.335 | 0.476 | 7.57 | 7.09 | 1213 |
| Ex. 24 | 7500 | 0.335 | 0.476 | 8.46 | 7.98 | 1206 |
| Ex. 25 | 5000 | 0.5 | 0.476 | 5.66 | 5.19 | 1233 |
| Ex. 26 | 5000 | 0.65 | 0.476 | 4.97 | 4.50 | 1242 |
| Ex. 27 | 11000 | 0.65 | 0.476 | 7.35 | 6.88 | 1215 |

TABLE 2B

| Example number | $SiF_4$ partial pressure (atm) | $\Phi$ ($cm^2 \cdot K^{(1/2)}$)/ $atm^{(3/4)}$ | Fluorine Profile shape | Penetration, (a-r)/a | Max. F on outside of preform (wt. %) |
|---|---|---|---|---|---|
| Ex. 1 | 0.2 | 222 | triangular | 0.55 | 2.11 |
| Ex. 2 | 0.23 | 125 | triangular | 0.61 | 2.09 |
| Ex. 3 | 0.30 | 51 | triangular | 1 | 2.09 |
| Ex. 4 | 0.300 | 27 | trapezoid | 1 | 1.97 |
| Ex. 5 | 0.38 | 23 | trapezoid | 1 | 2.09 |
| Ex. 6 | 0.278 | 51 | triangular | 1 | 2.09 |
| Ex. 7 | 0.317 | 51 | triangular | 1 | 2.09 |
| Ex. 8 | 0.339 | 51 | triangular | 1 | 2.09 |
| Ex. 9 | 0.263 | 51 | triangular | 1 | 2.09 |
| Ex. 10 | 0.242 | 50 | triangular | 1 | 2.08 |
| Ex. 11 | 0.214 | 126 | triangular | 0.61 | 2.09 |
| Ex. 12 | 0.245 | 124 | triangular | 0.61 | 2.09 |
| Ex. 13 | 0.263 | 123 | triangular | 0.61 | 2.09 |
| Ex. 14 | 0.203 | 125 | triangular | 0.61 | 2.09 |
| Ex. 15 | 0.186 | 126 | triangular | 0.61 | 2.09 |
| Ex. 16 | 0.186 | 222 | triangular | 0.55 | 2.11 |
| Ex. 17 | 0.213 | 219 | triangular | 0.55 | 2.11 |
| Ex. 18 | 0.228 | 219 | triangular | 0.55 | 2.11 |
| Ex. 19 | 0.176 | 223 | triangular | 0.55 | 2.11 |
| Ex. 20 | 0.167 | 218 | triangular | 0.55 | 2.11 |
| Ex. 21 | 0.107 | 52 | triangular | 1 | 1.50 |
| Ex. 22 | 0.1 | 51 | triangular | 1 | 1.50 |
| Ex. 23 | 0.114 | 50 | triangular | 1 | 1.50 |
| Ex. 24 | 0.123 | 50 | triangular | 1 | 1.50 |
| Ex. 25 | 0.094 | 51 | triangular | 1 | 1.50 |
| Ex. 26 | 0.086 | 52 | triangular | 1 | 1.50 |
| Ex. 27 | 0.112 | 50 | triangular | 1 | 1.50 |

Comparative Examples 1-6 in Tables 1A and 1B were modeled. With regard to Tables 2A and 2B, Examples 1-3 were manufactured according to the disclosure, and Examples 4-27 were modeled, also according to the disclosure. In the Comparative Examples 1-6 shown in Tables 1A and 1B, the dopant parameters, $\Phi$, for these samples are less than 5 $cm^2$ $K^{1/2}/atm^{3/4}$, corresponding to conditions where the diffusion rate of the fluorine dopant is much faster than the fluorine-germania soot reaction rate and sintering of the co-doped germania-fluorine soot. Consequently, the doped fluorine profiles are flat in Comparative Examples 1-6. In particular, the fluorine concentration at the center of the sintered, co-doped preform is comparable or otherwise equal to the fluorine concentration on the outside of the sintered, co-doped preform.

Figure 4:
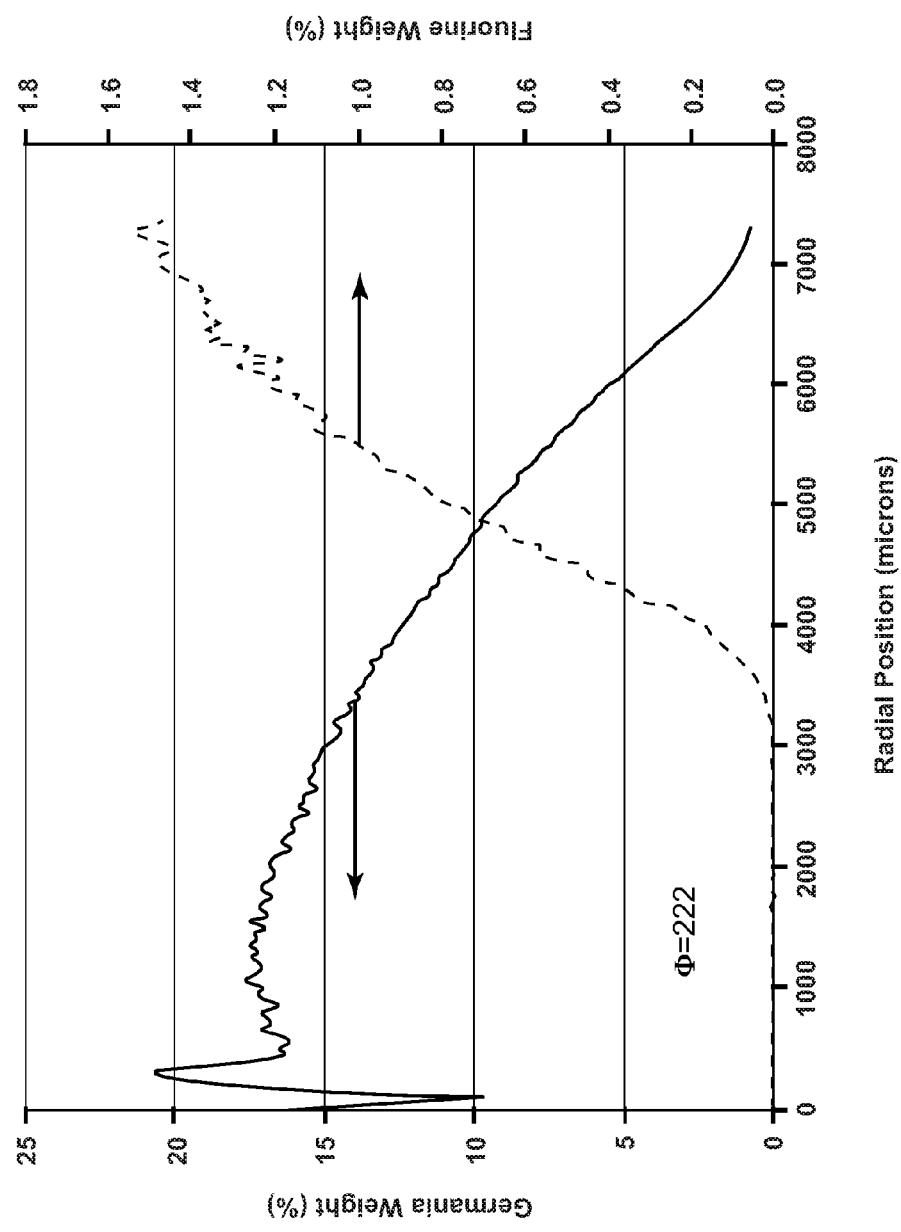
FIG. 4 is a plot of $GeO_2$ and F concentration in a co-doped core preform for a wide-band multi-mode optical fiber, processing with a doping parameter, $\Phi=222$, as a function of core preform radial position according to an aspect of the disclosure.
Figure 5A:
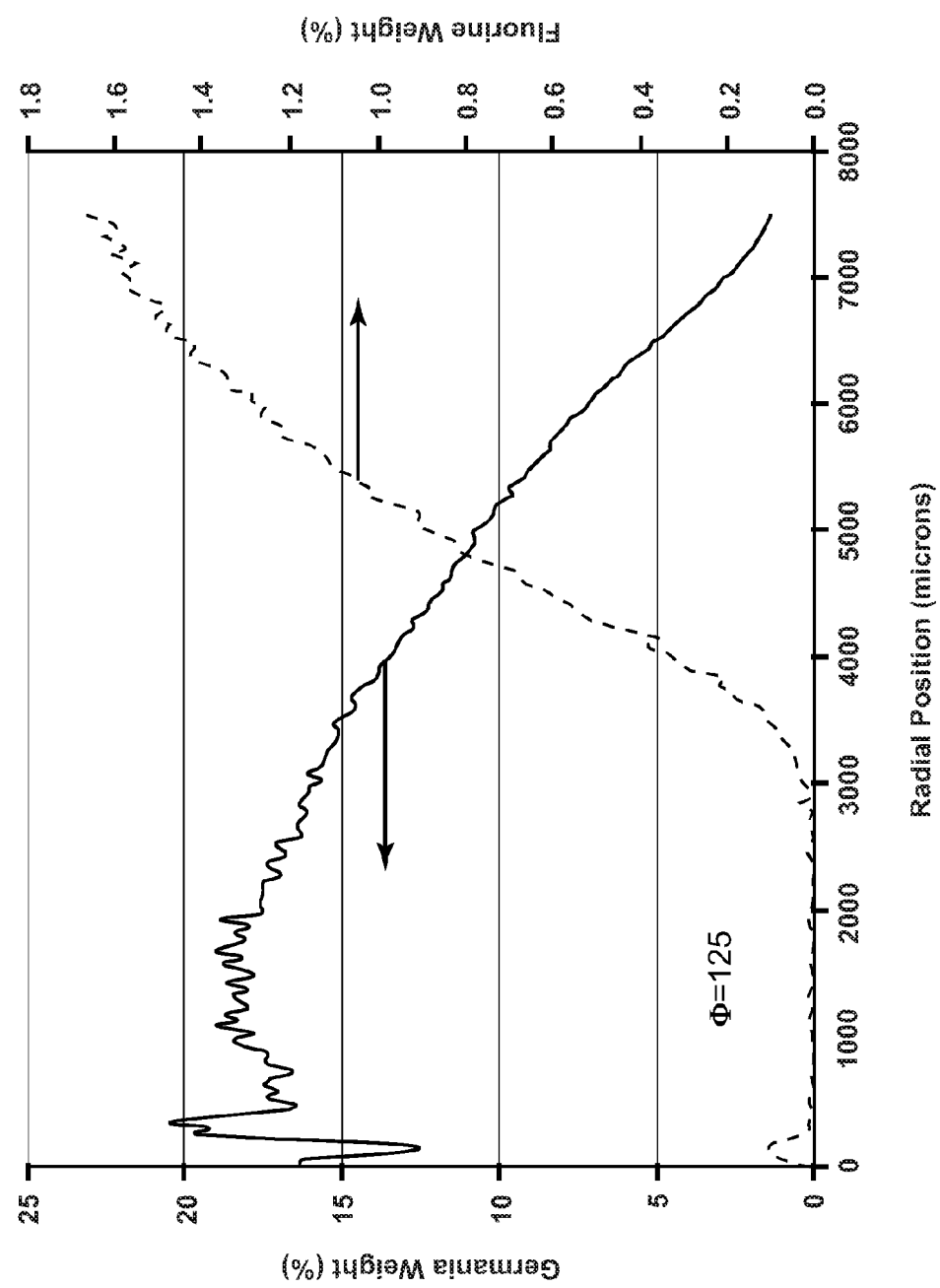
FIG. 5A is a plot of $GeO_2$ and F concentration in a co-doped core preform for a wide-band multi-mode optical fiber, processing with a doping parameter, $\Phi=125$, as a function of core preform radial position according to an aspect of the disclosure.
Figure 5B:
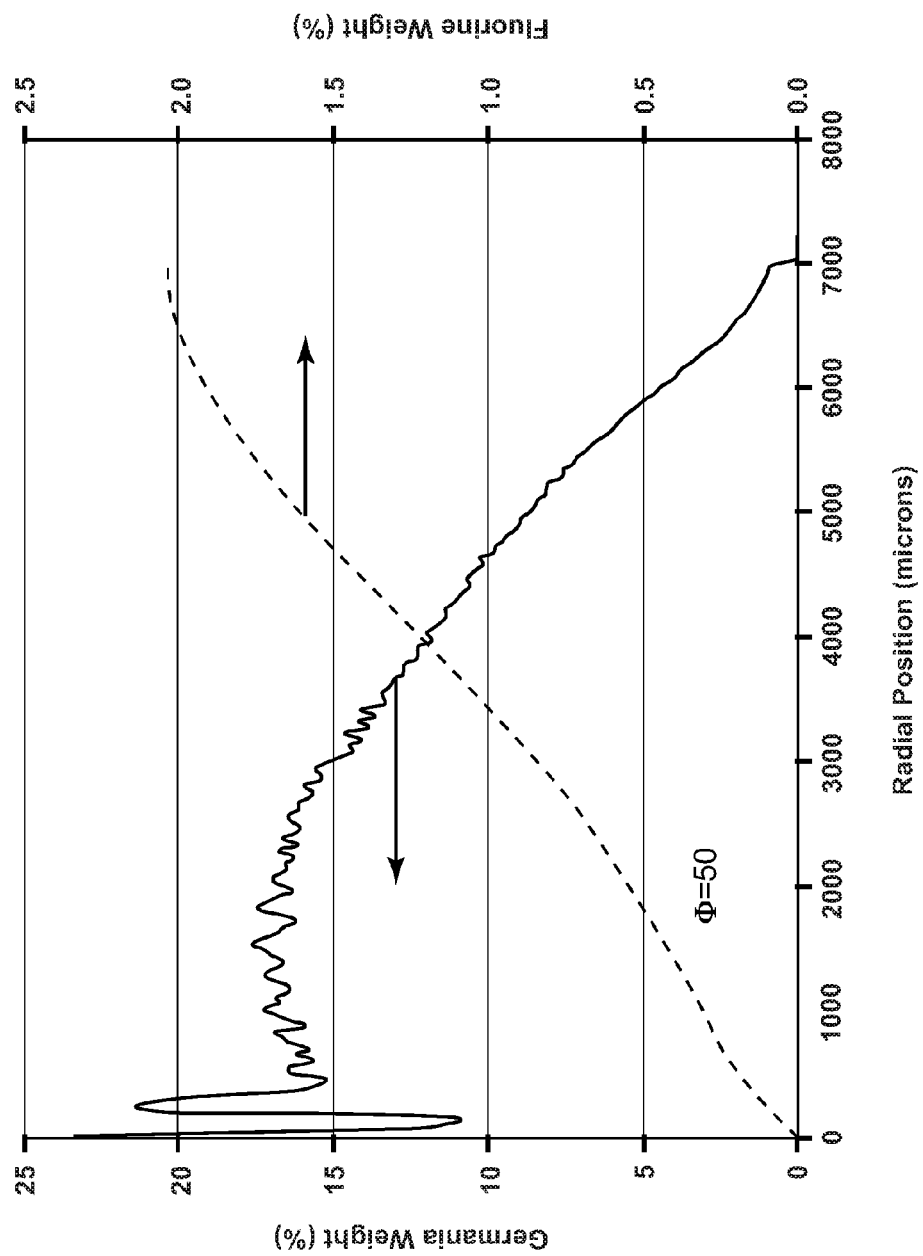
FIG. 5B is a plot of $GeO_2$ and F concentration in a co-doped core preform for a wide-band multi-mode optical fiber, processing with a doping parameter, $\Phi=50$, as a function of core preform radial position according to an aspect of the disclosure.

With regard to the Examples 1-27 outlined in Tables 2A and 2B, the doping parameters, $\Phi$, are between 20 $cm^2$ $K^{1/2}/atm^{3/4}$ and 300 $cm^2$ $K^{1/2}/atm^{3/4}$. As a result, the fluorine doped profiles are advantageously non-uniform because of diffusional limitations, with the fluorine concentration being highest on the outside of the sintered co-doped preform and much smaller at the center of the sintered, co-doped preform. For values of $\Phi=222$ $cm^2$ $K^{1/2}/atm^{3/4}$, the fluorine doped profile is as shown in FIG. 4, where the maximum fluorine concentration is on the outside of the preform and the fluorine is able to penetrate only the outside 55% of the preform (as measured by an electron microprobe method) to a radial position of about 3200 microns. For values of $\Phi=125$ $cm^2$ $K^{1/2}/atm^{3/4}$, the fluorine doped profile is as shown in FIG. 5A, where the maximum fluorine concentration is on the outside of the preform and the fluorine is able to penetrate only the outside 61% of the preform (as measured by electron microprobe method) to a radial position of about 2900 microns. For values of $\Phi=50$ $cm^2$ $K^{1/2}/atm^{3/4}$, the fluorine doped profile is as shown in FIG. 5B, where the maximum fluorine concentration is on the outside of the preform and the fluorine is able to penetrate across the preform but has almost zero fluorine concentration at the center of the preform (as measured by an electron microprobe method) at a radial position of zero microns. In the different Examples shown in Tables 2A and 2B, by targeting a specific value of $\Phi$, fluorine dopant precursor (e.g., $SiF_4$) concentration (e.g., as the partial pressure of the fluorine dopant) and doping temperature ($T_{dop}$) are chosen for a given preform size and preform density to obtain target, doped fluorine profile shapes in the sintered preform along with the maximum fluorine concentration on the outside of the preform.

Figure 6A:
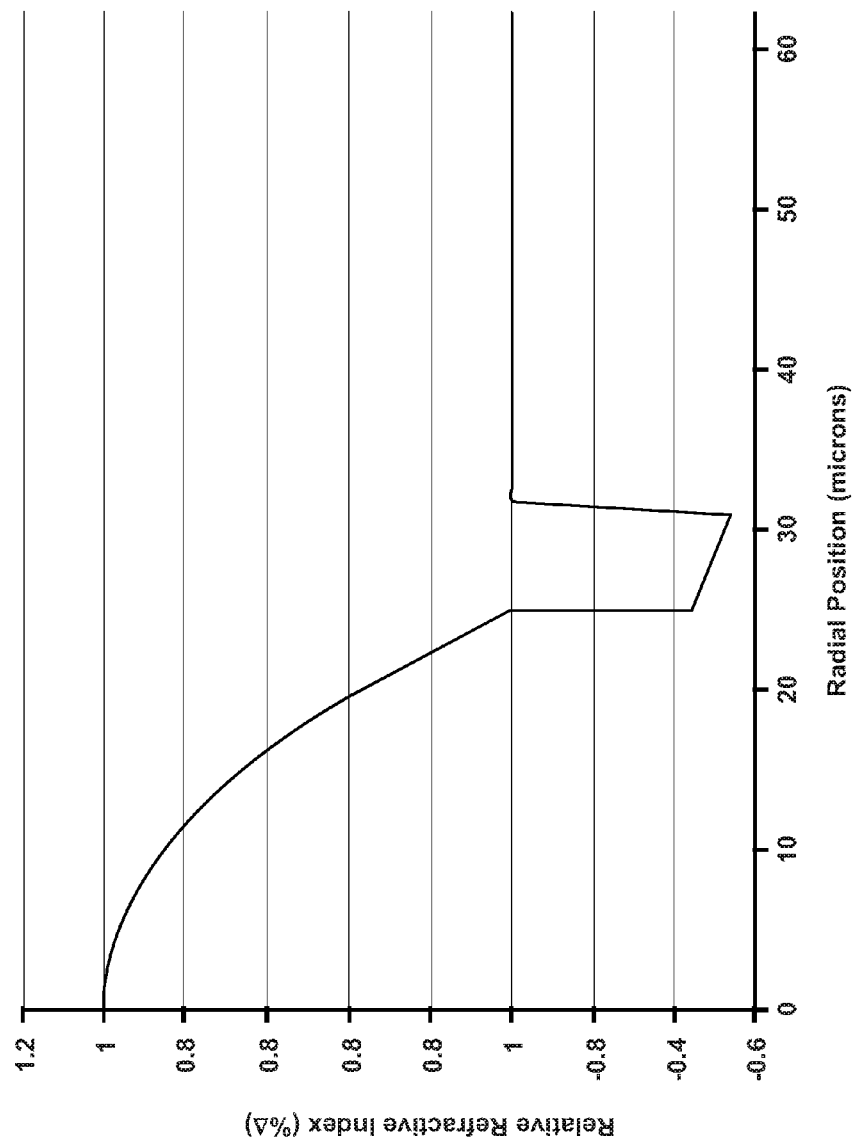
FIG. 6A is a schematic refractive index profile as a function of fiber radial position for a bend-insensitive, wide-band optical fiber having a co-doped core and a trench in the cladding that can be processed according to an aspect of the disclosure.
Figure 6B:
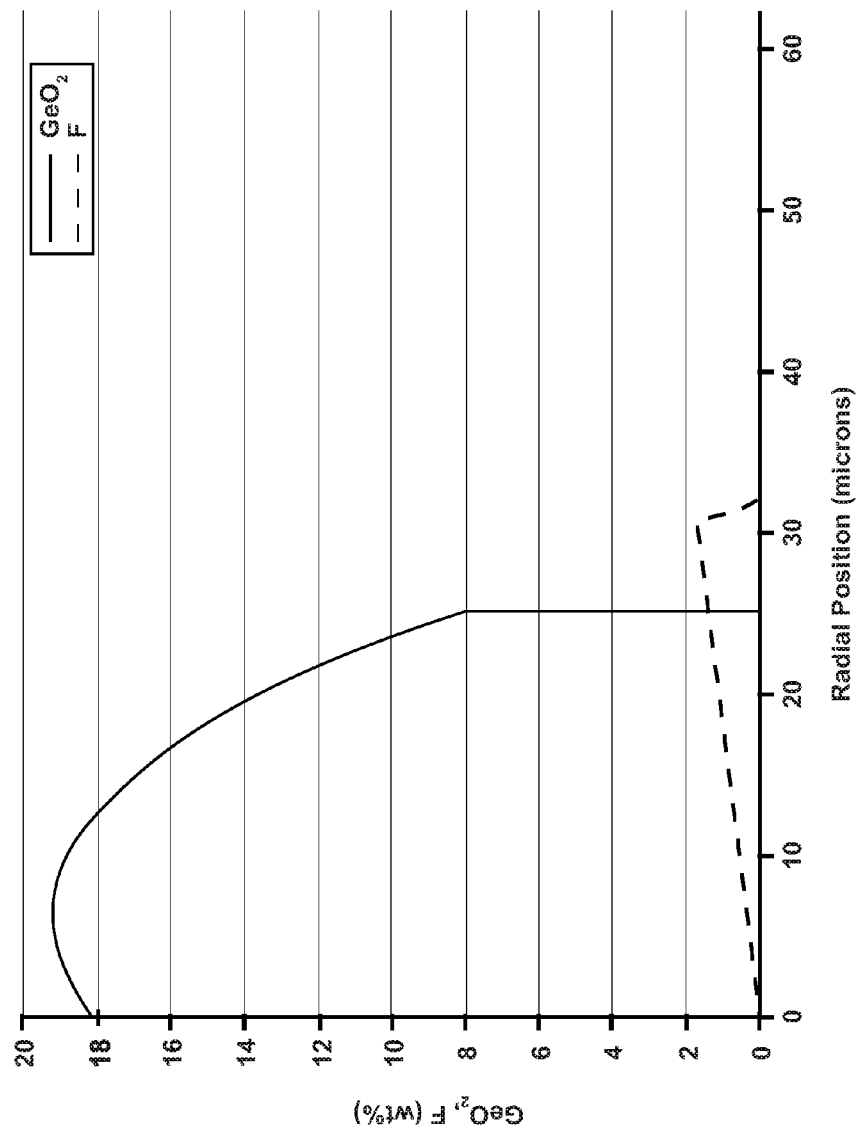
FIG. 6B is a plot of $GeO_2$ and F concentration as a function of fiber radial distance for the fiber depicted in FIG. 6A, as processed according to an aspect of the disclosure.

Referring now to FIG. 6A, a schematic refractive index profile as a function of fiber radial position for a bend-insensitive, wide-band optical fiber having a co-doped core and a trench in the cladding that can be processed according to the foregoing method of making a co-doped core preform and trench for wide-band MMFs. In particular, as shown in FIG. 6B, a plot of $GeO_2$ and F concentration as a function of fiber radial distance is provided for the fiber shown in FIG. 6A. Note that the step for doping fluorine into the silica-based, $GeO_2$-doped preform is conducted in a single step such that fluorine varies in concentration from its highest point at the outer edge of the trench to about zero at the centerline of the core preform.

Figure 7A:
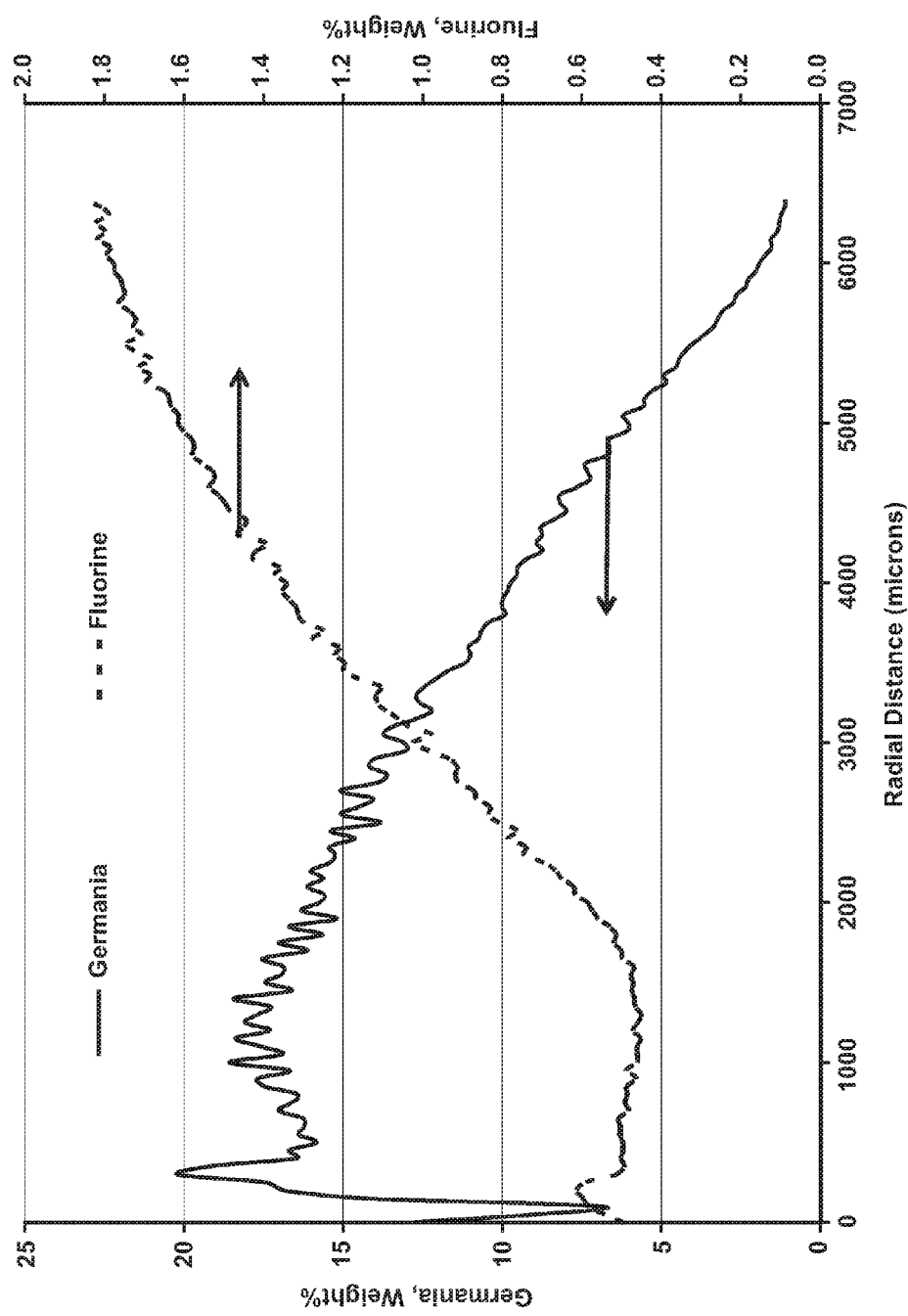
FIG. 7A is a plot of $GeO_2$ and F concentration as a function of radial distance for a manufactured preform, as processed according to an aspect of the disclosure.
Figure 7B:
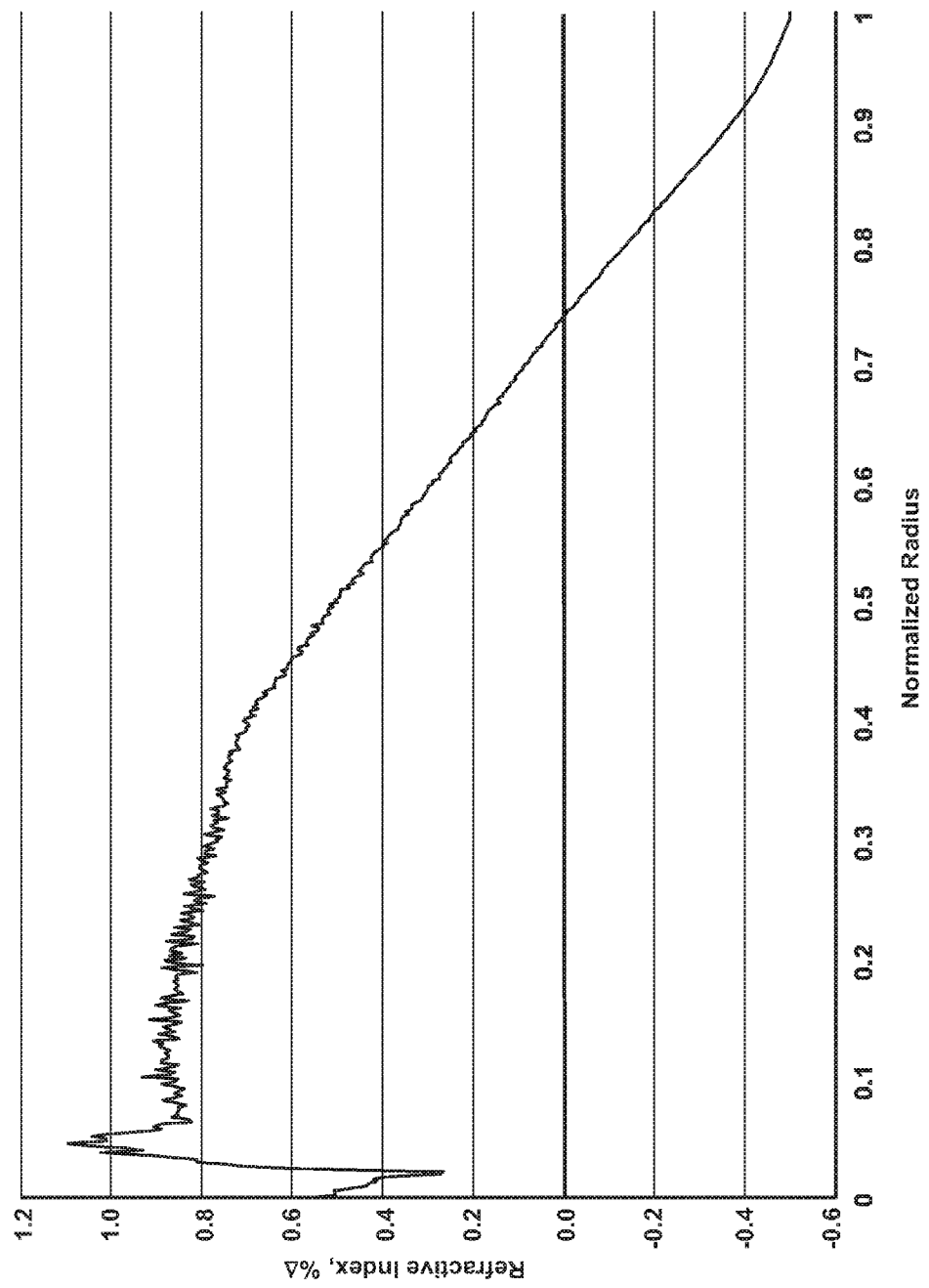
FIG. 7B is a plot of relative refractive index as a function of normalized radial distance for a manufactured preform, as processed according to an aspect of the disclosure.
Figure 7C:
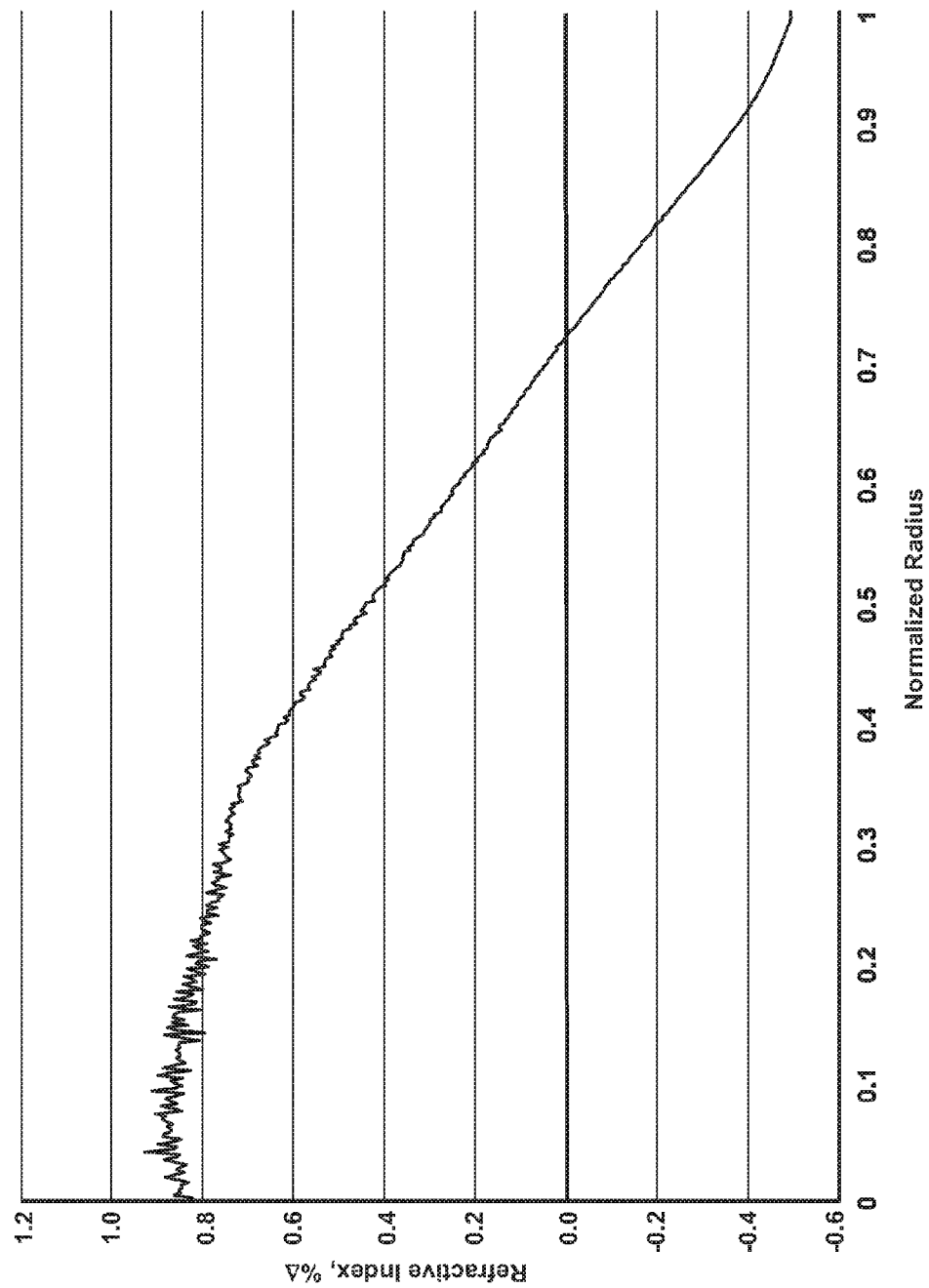
FIG. 7C is a plot of relative refractive index as a function of normalized radial distance for a manufactured preform, as processed according to an aspect of the disclosure.

In another embodiment, a manufactured optical preform was made as follows. A 1 m, 5050 g soot preform having soot density of 0.34 g/cm³ and a parabolic, germania-doped profile was deposited on an alumina bait rod in a laydown step. The bait rod was removed and the soot preform was placed into a furnace. The soot preform was treated in an atmosphere comprising helium and 2.5 vol. % chlorine (i.e., a dehydration agent) at 1050° C. The preform was then doped in an atmosphere comprising helium and 30 vol. % $SiF_4$ at a temperature of 1250° C. for 90 minutes. These doping temperature and time conditions were calculated using the doping parameter $\Phi$ (as outlined earlier in the disclosure), in which the doping parameter, $\Phi$, such that $\Phi=50$ $cm^2$ $K^{1/2}/atm^{3/4}$. The preform was then heated to a temperature between about 1450 and about 1500° C. to completely sinter the soot preform into a void-free sintered glass preform. The germania and fluorine concentration profiles for the sintered glass preform were characterized by an electron microprobe, and are shown in FIG. 7A. The relative refractive index profile of the co-doped sintered glass preform was measured and is shown in FIG. 7B. The co-doped sintered glass preform thus represents a core-trench assembly, where the parabolic region having refractive index above the index of pure silica is the core region and the region having refractive index less than the index of pure silica is the trench region. The core region has a core alpha of about 2. The refractive index profile of the core-trench glass preform with the etched centerline (described below) is shown in FIG. 7C.

The sintered core-trench assembly glass preform depicted in FIGS. 7A-7C can subsequently undergo one or more of the following steps: 1) etched at its centerline to remove the centerline profile errors; 2) subjected to a vacuum at its centerline while the preform is hot in order to close the centerline hole; 3) redrawn into canes; 4) subjected to a silica overclad layer deposition in order to form an optical fiber preform; or 5) drawn into an optical fiber. The core and trench shown in FIG. 7C can be overclad with silica and drawn into optical fiber such that in fiber space (i.e., a fiber having a radius of 62.5 microns) the core radius has a radius of 25 micron, a maximum core refractive index of 0.93%, a core alpha of about 2, a trench region with a width of 9.63 microns, a minimum refractive index of −0.5% and a trench volume of 169%·micron$^2$.

A further aspect of the present disclosure relates to a method of making a multi-mode optical fiber (e.g., multi-mode optical fiber 10 as shown in FIGS. 1 and 1A). Essentially, the method involves making a core preform or a core preform and a trench according to the foregoing methods followed by the deposition of a cladding or the final portions of the cladding. In particular, the method includes the steps: depositing a porous soot comprising germania-doped silica to form a germania-doped, porous soot preform; and optionally depositing a porous silica layer over the germania-doped porous soot preform. The next step of the method includes doping the germania-doped porous soot preform and the porous silica layer with a fluorine dopant in a furnace to form a co-doped soot preform having a core region and a fluorine-doped trench region; and consolidating the co-doped soot preform (e.g., above about 1450° C.) to form a sintered glass, co-doped core preform having a refractive index alpha profile between 1.9 and 2.2 measured at 850 nm. Further, the method includes depositing a cladding comprising silica over the sintered glass, co-doped preform to form a multi-mode optical fiber preform; drawing the optical fiber preform into a multi-mode optical fiber. As noted earlier, the step of doping the germania-doped soot preform and the porous silica layer with a fluorine dopant is conducted such that a doping parameter, Φ, is between 20 and 300, and given by:

$$\Phi = \frac{1 \times 10^{14} R_{prc}^2 \exp(-E/RT_{dop}) T_{dop}^{1/2}}{x^{3/4}},$$

where $T_{dop}$ is the doping temperature, x is the partial pressure of the fluorine dopant in the furnace during the doping step, E is the activation energy of the fluorine doping step, R is the universal gas constant, and $R_{pre}$ is the thickness of the germania-doped porous soot preform.

It is to be understood that the foregoing is exemplary only and is intended to provide an overview for the understanding of the nature and character of the fibers which are defined by the claims. The accompanying drawings are included to provide a further understanding of the preferred embodiments and are incorporated and constitute part of the specification. The drawings illustrate various features and embodiments which, together with their description, serve to explain the principals and operation. It will be apparent to those skilled in the art that various modifications and variations can be made to the preferred embodiments as described herein without departing from the spirit or scope of the claims.

What is claimed is:

1. A method of making a co-doped core preform for a multi-mode optical fiber, comprising:
   depositing a porous soot comprising germania-doped silica to form a germania-doped porous soot preform;
   doping the germania-doped porous soot preform in a furnace with a fluorine dopant to form a co-doped soot preform; and
   consolidating the co-doped soot preform to form a sintered glass, co-doped core preform having a refractive index alpha profile between 1.9 and 2.2 measured at 850 nm,
   wherein the step of doping the germania-doped soot preform with a fluorine dopant is conducted such that a doping parameter, Φ, is between 20 and 300 cm$^2$·K$^{(1/2)}$/atm$^{(3/4)}$, and given by:

$$\Phi = \frac{1 \times 10^{14} R_{prc}^2 \exp(-E/RT_{dop}) T_{dop}^{1/2}}{x^{3/4}},$$

where $T_{dop}$ is the doping temperature, x is the partial pressure of the fluorine dopant in the furnace during the doping step (atmospheres), E is the activation energy of the fluorine doping step, R is the universal gas constant, E/R=55750 degrees K and $R_{pre}$ is the radial thickness of the germania-doped porous soot preform.

2. The method of claim 1, further comprising:
   prior to said doping step, treating the germania-doped porous soot preform with a dehydration agent between about 1000° C. and about 1200° C.

3. The method of claim 1, wherein the step of doping the germania-doped porous soot preform with a fluorine dopant is conducted at a doping temperature ($T_{dop}$) of about 1250° C. or greater.

4. The method of claim 1, wherein the step of doping the germania-doped porous soot preform with a fluorine dopant is conducted at a doping temperature ($T_{dop}$) of greater than 1300° C.

5. The method of claim 1, wherein the step of depositing a porous soot comprising germania-doped silica to form a germania-doped porous soot preform is conducted with an outside vapor deposition (OVD) or a vapor-phase axial deposition (VAD) process.

6. The method of claim 1, wherein the sintered glass preform has a fluorine-doped profile with an alpha parameter, $\alpha_{fluorine}$, given by: $0.8 \leq \alpha_{fluorine} \leq 2.4$ at 850 nm.

7. The method of claim 1, wherein the concentration of fluorine at the centerline of the sintered glass co-doped core preform is essentially zero, and the concentration of fluorine increases with radius to the outer radius of the co-doped core preform.

8. The method of claim 1, further comprising:
   prior to said doping step, depositing a porous silica layer over the germania-doped porous soot preform, wherein the doping step comprises doping the germania-doped porous soot preform and the porous silica layer with a fluorine dopant in a furnace to form a co-doped soot preform having a core region and a fluorine-doped trench region, and further wherein the step of doping the germania-doped soot preform and the porous silica layer with a fluorine dopant is conducted such that a doping parameter, $\Phi$, is between 20 and 300 cm$^2 \cdot$K$^{(1/2)}$/atm$^{(3/4)}$, and given by:

$$\Phi = \frac{1 \times 10^{14} R_{prc}^2 \exp(-E/RT_{dop}) T_{dop}^{1/2}}{x^{3/4}},$$

where $T_{dop}$ is the doping temperature, x is the partial pressure of the fluorine dopant in the furnace during the doping step (atmospheres), E is the activation energy of the fluorine doping step, R is the universal gas constant, E/R=55750 degrees K, and $R_{pre}$ is the radial thickness of the germania-doped porous soot preform.

9. The method of claim 8, wherein the trench region comprises co-doped fluorine and germania.

10. The method of claim 8, wherein the step of doping the germania-doped porous soot preform and the porous silica layer with a fluorine dopant is conducted at a doping temperature ($T_{dop}$) of about 1250° C. or greater.

11. The method of claim 8, wherein the step of doping the germania-doped porous soot preform and the porous silica layer with a fluorine dopant is conducted at a doping temperature ($T_{dop}$) of greater than 1300° C.

12. The method of claim 8, wherein the steps of depositing a porous soot comprising germania-doped silica to form a germania-doped porous soot preform and depositing a porous silica layer over the germania-doped porous soot preform are conducted with an outside vapor deposition (OVD) or a vapor-phase axial deposition (VAD) process.

13. The method of claim 12, wherein the steps of depositing a porous soot comprising germania-doped silica to form a germania-doped porous soot preform and depositing a porous silica layer over the germania-doped porous soot preform are conducted in a single process step.

14. The method of claim 8, wherein the sintered glass preform has a fluorine-doped profile with an alpha parameter, $\alpha_{fluorine}$, given by: $0.8 \leq \alpha_{fluorine} \leq 2.4$ at 850 nm.

15. The method of claim 8, wherein the concentration of fluorine at the centerline of the sintered glass, co-doped core preform is essentially zero, and the concentration of fluorine increases with radius within the co-doped core preform and to the outer radius of the trench.

16. The method of claim 8, further comprising:
depositing a cladding comprising silica over the sintered glass, co-doped preform to form a multi-mode optical fiber preform; and
drawing the optical fiber preform into a multi-mode optical fiber.

17. The method of claim 16, wherein the step of doping the germania-doped porous soot preform and the porous silica layer with a fluorine dopant is conducted at a doping temperature ($T_{dop}$) of about 1250° C. or greater.

18. The method of claim 16, wherein the steps of depositing a porous soot comprising germania-doped silica to form a germania-doped porous soot preform and depositing a porous silica layer over the germania-doped porous soot preform are conducted in a single process step with an outside vapor deposition (OVD) or a vapor-phase axial deposition (VAD) process.

19. The method of claim 16, wherein the sintered glass preform has a fluorine-doped profile with an alpha parameter, $\alpha_{fluorine}$, given by: $0.8 \leq \alpha_{fluorine} \leq 2.4$ at 850 nm.

20. The method of claim 16, wherein the multi-mode optical fiber is characterized by a root mean squared (RMS) pulse broadening that varies by no more than ±25% across an operating window of 0.4 µm or greater, the operating window within a wavelength range of 0.5 µm to 1.7 µm.

* * * * *

UNITED STATES PATENT AND TRADEMARK OFFICE
CERTIFICATE OF CORRECTION

PATENT NO.         : 9,964,701 B2
APPLICATION NO.    : 15/601527
DATED              : May 8, 2018
INVENTOR(S)        : Dana Craig Bookbinder et al.

Page 1 of 1

It is certified that error appears in the above-identified patent and that said Letters Patent is hereby corrected as shown below:

In the Claims

In Column 20, Line 27, Claim 1, delete "$K^{(1/2)})$" and insert --$K^{(1/2)}$--, therefor.

Signed and Sealed this
Twenty-third Day of June, 2020

Andrei Iancu
*Director of the United States Patent and Trademark Office*